US012300936B2

(12) United States Patent
Paniagua et al.

(10) Patent No.: US 12,300,936 B2
(45) Date of Patent: May 13, 2025

(54) HIGH SPEED CONNECTOR

(71) Applicant: Amphenol Corporation, Wallingford, CT (US)

(72) Inventors: Jose Ricardo Paniagua, Newmarket, NH (US); Philip T. Stokoe, Attleboro, MA (US); Thomas S. Cohen, New Boston, NH (US); Robert Richard, Nashua, NH (US); Donald W. Milbrand, Jr., Bristol, NH (US); Eric Leo, Nashua, NH (US); Mark W. Gailus, Concord, MA (US)

(73) Assignee: Amphenol Corporation, Wallingford, CT (US)

( * ) Notice: Subject to any disclaimer, the term of this patent is extended or adjusted under 35 U.S.C. 154(b) by 264 days.

(21) Appl. No.: 16/795,398

(22) Filed: Feb. 19, 2020

(65) Prior Publication Data

US 2020/0266585 A1 Aug. 20, 2020

Related U.S. Application Data

(60) Provisional application No. 62/807,653, filed on Feb. 19, 2019.

(51) Int. Cl.
*H01R 13/6591* (2011.01)
*H01R 12/72* (2011.01)
(Continued)

(52) U.S. Cl.
CPC ....... *H01R 13/6471* (2013.01); *H01R 12/721* (2013.01); *H01R 13/40* (2013.01);
(Continued)

(58) Field of Classification Search
CPC .................. H01R 13/40; H01R 13/646; H01R 13/6471–6591; H01R 13/652; H01R 13/6587; H01R 12/721; H01R 43/24
See application file for complete search history.

(56) References Cited

U.S. PATENT DOCUMENTS

| | | | |
|---|---|---|---|
| 2,996,710 | A | 8/1961 | Pratt |
| 3,002,162 | A | 9/1961 | Garstang |

(Continued)

FOREIGN PATENT DOCUMENTS

| | | | |
|---|---|---|---|
| CN | 1075390 | A | 8/1993 |
| CN | 1098549 | A | 2/1995 |

(Continued)

OTHER PUBLICATIONS

Chinese communication for Chinese Application No. 201580014851.4, dated Jun. 1, 2020.

(Continued)

*Primary Examiner* — Felix O Figueroa
(74) *Attorney, Agent, or Firm* — Wolf, Greenfield & Sacks, P.C.

(57) ABSTRACT

An interconnection system with lossy material of a first connector adjacent a ground conductor of a second connector. The lossy material may damp resonances at a mating interface of the first and second connectors. In some embodiments, the lossy material may be attached to a ground conductor of the first connector. In some embodiments, the lossy material may be shaped as horns that extend along a cavity configured to receive a ground conductor of a mating connector.

19 Claims, 12 Drawing Sheets

(51) Int. Cl.

| | |
|---|---|
| ***H01R 13/40*** | (2006.01) |
| ***H01R 13/6471*** | (2011.01) |
| ***H01R 13/652*** | (2006.01) |
| ***H01R 13/6587*** | (2011.01) |
| ***H01R 43/24*** | (2006.01) |

(52) U.S. Cl.

CPC ....... *H01R 13/652* (2013.01); *H01R 13/6587* (2013.01); *H01R 13/6591* (2013.01); *H01R 43/24* (2013.01)

(56) References Cited

U.S. PATENT DOCUMENTS

| | | | |
|---|---|---|---|
| 3,134,950 | A | 5/1964 | Cook |
| 3,243,756 | A | 3/1966 | Ruete et al. |
| 3,322,885 | A | 5/1967 | May et al. |
| 3,390,369 | A | 6/1968 | Zavertnik et al. |
| 3,390,389 | A | 6/1968 | Bluish |
| 3,505,619 | A | 4/1970 | Bishop |
| 3,573,677 | A | 4/1971 | Detar |
| 3,731,259 | A | 5/1973 | Occhipinti |
| 3,743,978 | A | 7/1973 | Fritz |
| 3,745,509 | A | 7/1973 | Woodward et al. |
| 3,786,372 | A | 1/1974 | Epis et al. |
| 3,825,874 | A | 7/1974 | Peverill |
| 3,848,073 | A | 11/1974 | Simons et al. |
| 3,863,181 | A | 1/1975 | Glance et al. |
| 3,999,830 | A | 12/1976 | Herrmann, Jr. et al. |
| 4,155,613 | A | 5/1979 | Brandeau |
| 4,175,821 | A | 11/1979 | Hunter |
| 4,195,272 | A | 3/1980 | Boutros |
| 4,215,910 | A | 8/1980 | Walter |
| 4,272,148 | A | 6/1981 | Knack, Jr. |
| 4,276,523 | A | 6/1981 | Boutros et al. |
| 4,371,742 | A | 2/1983 | Manly |
| 4,408,255 | A | 10/1983 | Adkins |
| 4,447,105 | A | 5/1984 | Ruehl |
| 4,457,576 | A | 7/1984 | Cosmos et al. |
| 4,471,015 | A | 9/1984 | Ebneth et al. |
| 4,472,765 | A | 9/1984 | Hughes |
| 4,484,159 | A | 11/1984 | Whitley |
| 4,490,283 | A | 12/1984 | Kleiner |
| 4,518,651 | A | 5/1985 | Wolfe, Jr. |
| 4,519,664 | A | 5/1985 | Tillotson |
| 4,519,665 | A | 5/1985 | Althouse et al. |
| 4,571,014 | A | 2/1986 | Robin et al. |
| 4,605,914 | A | 8/1986 | Harman |
| 4,607,907 | A | 8/1986 | Bogursky |
| 4,632,476 | A | 12/1986 | Schell |
| 4,636,752 | A | 1/1987 | Saito |
| 4,655,518 | A | 4/1987 | Johnson et al. |
| 4,674,812 | A | 6/1987 | Thom et al. |
| 4,678,260 | A | 7/1987 | Gallusser et al. |
| 4,682,129 | A | 7/1987 | Bakermans et al. |
| 4,686,607 | A | 8/1987 | Johnson |
| 4,728,762 | A | 3/1988 | Roth et al. |
| 4,737,598 | A | 4/1988 | O'Connor |
| 4,751,479 | A | 6/1988 | Parr |
| 4,761,147 | A | 8/1988 | Gauthier |
| 4,806,107 | A | 2/1989 | Arnold et al. |
| 4,824,383 | A | 4/1989 | Lemke |
| 4,836,791 | A | 6/1989 | Grabbe et al. |
| 4,846,724 | A | 7/1989 | Sasaki et al. |
| 4,846,727 | A | 7/1989 | Glover et al. |
| 4,871,316 | A | 10/1989 | Herrell et al. |
| 4,876,630 | A | 10/1989 | Dara |
| 4,878,155 | A | 10/1989 | Conley |
| 4,889,500 | A | 12/1989 | Lazar et al. |
| 4,902,243 | A | 2/1990 | Davis |
| 4,948,922 | A | 8/1990 | Varadan et al. |
| 4,970,354 | A | 11/1990 | Iwasa et al. |
| 4,971,726 | A | 11/1990 | Maeno et al. |
| 4,975,084 | A | 12/1990 | Fedder et al. |
| 4,984,992 | A | 1/1991 | Beamenderfer et al. |
| 4,992,060 | A | 2/1991 | Meyer |
| 5,000,700 | A | 3/1991 | Masubuchi et al. |
| 5,046,084 | A | 9/1991 | Barrett et al. |
| 5,046,952 | A | 9/1991 | Cohen et al. |
| 5,046,960 | A | 9/1991 | Fedder |
| 5,066,236 | A | 11/1991 | Broeksteeg |
| 5,135,405 | A | 8/1992 | Fusselman et al. |
| 5,141,454 | A | 8/1992 | Garrett et al. |
| 5,150,086 | A | 9/1992 | Ito |
| 5,166,527 | A | 11/1992 | Solymar |
| 5,168,252 | A | 12/1992 | Naito |
| 5,168,432 | A | 12/1992 | Murphy et al. |
| 5,176,538 | A | 1/1993 | Hansell, III et al. |
| 5,190,472 | A | 3/1993 | Voltz et al. |
| 5,246,388 | A | 9/1993 | Collins et al. |
| 5,259,773 | A | 11/1993 | Champion et al. |
| 5,266,055 | A | 11/1993 | Naito et al. |
| 5,280,257 | A | 1/1994 | Cravens et al. |
| 5,281,762 | A | 1/1994 | Long et al. |
| 5,287,076 | A | 2/1994 | Johnescu et al. |
| 5,323,299 | A | 6/1994 | Weber |
| 5,334,050 | A | 8/1994 | Andrews |
| 5,335,146 | A | 8/1994 | Stucke |
| 5,340,334 | A | 8/1994 | Nguyen |
| 5,346,410 | A | 9/1994 | Moore, Jr. |
| 5,352,123 | A | 10/1994 | Sample et al. |
| 5,403,206 | A | 4/1995 | McNamara et al. |
| 5,407,622 | A | 4/1995 | Cleveland et al. |
| 5,429,520 | A | 7/1995 | Morlion et al. |
| 5,429,521 | A | 7/1995 | Morlion et al. |
| 5,433,617 | A | 7/1995 | Morlion et al. |
| 5,433,618 | A | 7/1995 | Morlion et al. |
| 5,456,619 | A | 10/1995 | Belopolsky et al. |
| 5,461,392 | A | 10/1995 | Mott et al. |
| 5,474,472 | A | 12/1995 | Niwa et al. |
| 5,484,310 | A | 1/1996 | McNamara et al. |
| 5,490,372 | A | 2/1996 | Schlueter |
| 5,496,183 | A | 3/1996 | Soes et al. |
| 5,499,935 | A | 3/1996 | Powell |
| 5,539,148 | A | 7/1996 | Konishi et al. |
| 5,551,893 | A | 9/1996 | Johnson |
| 5,554,050 | A | 9/1996 | Marpoe, Jr. |
| 5,562,497 | A | 10/1996 | Yagi et al. |
| 5,564,949 | A | 10/1996 | Wellinsky |
| 5,571,991 | A | 11/1996 | Highum et al. |
| 5,597,328 | A | 1/1997 | Mouissie |
| 5,605,469 | A | 2/1997 | Wellinsky et al. |
| 5,620,340 | A | 4/1997 | Andrews |
| 5,651,702 | A | 7/1997 | Hanning et al. |
| 5,660,551 | A | 8/1997 | Sakurai |
| 5,669,789 | A | 9/1997 | Law |
| 5,702,258 | A | 12/1997 | Provencher et al. |
| 5,755,597 | A | 5/1998 | Panis et al. |
| 5,795,191 | A | 8/1998 | Preputnick et al. |
| 5,796,323 | A | 8/1998 | Uchikoba et al. |
| 5,803,768 | A | 9/1998 | Zell et al. |
| 5,831,491 | A | 11/1998 | Buer et al. |
| 5,833,486 | A | 11/1998 | Shinozaki |
| 5,833,496 | A | 11/1998 | Hollander et al. |
| 5,842,887 | A | 12/1998 | Andrews |
| 5,870,528 | A | 2/1999 | Fukuda |
| 5,885,095 | A | 3/1999 | Cohen et al. |
| 5,887,158 | A | 3/1999 | Sample et al. |
| 5,904,594 | A | 5/1999 | Longueville et al. |
| 5,924,899 | A | 7/1999 | Paagman |
| 5,931,686 | A | 8/1999 | Sasaki et al. |
| 5,959,591 | A | 9/1999 | Aurand |
| 5,961,355 | A | 10/1999 | Morlion et al. |
| 5,971,809 | A | 10/1999 | Ho |
| 5,980,321 | A | 11/1999 | Cohen et al. |
| 5,981,869 | A | 11/1999 | Kroger |
| 5,982,253 | A | 11/1999 | Perrin et al. |
| 5,993,259 | A | 11/1999 | Stokoe et al. |
| 5,997,361 | A | 12/1999 | Driscoll et al. |
| 6,019,616 | A | 2/2000 | Yagi et al. |
| 6,042,394 | A | 3/2000 | Mitra et al. |
| 6,083,047 | A | 7/2000 | Paagman |
| 6,102,747 | A | 8/2000 | Paagman |
| 6,116,926 | A | 9/2000 | Ortega et al. |
| 6,120,306 | A | 9/2000 | Evans |

(56) References Cited

U.S. PATENT DOCUMENTS

| | | | |
|---|---|---|---|
| 6,123,554 | A | 9/2000 | Ortega et al. |
| 6,132,255 | A | 10/2000 | Verhoeven |
| 6,132,355 | A | 10/2000 | Derie |
| 6,135,824 | A | 10/2000 | Okabe et al. |
| 6,146,202 | A | 11/2000 | Ramey et al. |
| 6,152,274 | A | 11/2000 | Blard et al. |
| 6,152,742 | A | 11/2000 | Cohen et al. |
| 6,152,747 | A | 11/2000 | McNamara |
| 6,163,464 | A | 12/2000 | Ishibashi et al. |
| 6,168,469 | B1 | 1/2001 | Lu |
| 6,171,115 | B1 | 1/2001 | Mickievicz et al. |
| 6,171,149 | B1 | 1/2001 | van Zanten |
| 6,174,202 | B1 | 1/2001 | Mitra |
| 6,174,203 | B1 | 1/2001 | Asao |
| 6,174,944 | B1 | 1/2001 | Chiba et al. |
| 6,179,651 | B1 | 1/2001 | Huang |
| 6,179,663 | B1 | 1/2001 | Bradley et al. |
| 6,196,853 | B1 | 3/2001 | Harting et al. |
| 6,203,396 | B1 | 3/2001 | Asmussen et al. |
| 6,206,729 | B1 | 3/2001 | Bradley et al. |
| 6,210,182 | B1 | 4/2001 | Elco et al. |
| 6,210,227 | B1 | 4/2001 | Yamasaki et al. |
| 6,217,372 | B1 | 4/2001 | Reed |
| 6,227,875 | B1 | 5/2001 | Wu et al. |
| 6,231,391 | B1 | 5/2001 | Ramey et al. |
| 6,238,245 | B1 | 5/2001 | Stokoe et al. |
| 6,267,604 | B1 | 7/2001 | Mickievicz et al. |
| 6,273,758 | B1 | 8/2001 | Lloyd et al. |
| 6,293,827 | B1 | 9/2001 | Stokoe |
| 6,296,496 | B1 | 10/2001 | Trammel |
| 6,299,438 | B1 | 10/2001 | Shagian et al. |
| 6,299,483 | B1 | 10/2001 | Cohen et al. |
| 6,299,484 | B2 | 10/2001 | Van Woensel |
| 6,299,492 | B1 | 10/2001 | Pierini et al. |
| 6,328,572 | B1 | 12/2001 | Higashida et al. |
| 6,328,601 | B1 | 12/2001 | Yip et al. |
| 6,333,468 | B1 | 12/2001 | Endoh et al. |
| 6,343,955 | B2 | 2/2002 | Billman et al. |
| 6,343,957 | B1 | 2/2002 | Kuo et al. |
| 6,347,962 | B1 | 2/2002 | Kline |
| 6,350,134 | B1 | 2/2002 | Fogg et al. |
| 6,358,088 | B1 | 3/2002 | Nishio et al. |
| 6,358,092 | B1 | 3/2002 | Siemon et al. |
| 6,364,711 | B1 | 4/2002 | Berg et al. |
| 6,364,713 | B1 | 4/2002 | Kuo |
| 6,375,510 | B2 | 4/2002 | Asao |
| 6,379,188 | B1 | 4/2002 | Cohen et al. |
| 6,380,485 | B1 | 4/2002 | Beaman et al. |
| 6,392,142 | B1 | 5/2002 | Uzuka et al. |
| 6,394,839 | B2 | 5/2002 | Reed |
| 6,396,712 | B1 | 5/2002 | Kuijk |
| 6,398,588 | B1 | 6/2002 | Bickford |
| 6,409,543 | B1 | 6/2002 | Astbury, Jr. et al. |
| 6,413,119 | B1 | 7/2002 | Gabrisko, Jr. et al. |
| 6,428,344 | B1 | 8/2002 | Reed |
| 6,431,914 | B1 | 8/2002 | Billman |
| 6,435,913 | B1 | 8/2002 | Billman |
| 6,435,914 | B1 | 8/2002 | Billman |
| 6,441,313 | B1 | 8/2002 | Novak |
| 6,454,605 | B1 | 9/2002 | Bassler et al. |
| 6,461,202 | B2 | 10/2002 | Kline |
| 6,471,549 | B1 | 10/2002 | Lappohn |
| 6,478,624 | B2 | 11/2002 | Ramey et al. |
| 6,482,017 | B1 | 11/2002 | Van Doorn |
| 6,491,545 | B1 | 12/2002 | Spiegel et al. |
| 6,503,103 | B1 | 1/2003 | Cohen et al. |
| 6,506,076 | B2 | 1/2003 | Cohen et al. |
| 6,517,360 | B1 | 2/2003 | Cohen |
| 6,520,803 | B1 | 2/2003 | Dunn |
| 6,527,587 | B1 | 3/2003 | Ortega et al. |
| 6,528,737 | B1 | 3/2003 | Kwong et al. |
| 6,530,790 | B1 | 3/2003 | McNamara et al. |
| 6,533,613 | B1 | 3/2003 | Turner et al. |
| 6,537,087 | B2 | 3/2003 | McNamara et al. |
| 6,538,524 | B1 | 3/2003 | Miller |
| 6,538,899 | B1 | 3/2003 | Krishnamurthi et al. |
| 6,540,522 | B2 | 4/2003 | Sipe |
| 6,540,558 | B1 | 4/2003 | Paagman |
| 6,540,559 | B1 | 4/2003 | Kemmick et al. |
| 6,541,712 | B1 | 4/2003 | Gately et al. |
| 6,544,072 | B2 | 4/2003 | Olson |
| 6,544,647 | B1 | 4/2003 | Hayashi et al. |
| 6,551,140 | B2 | 4/2003 | Billman et al. |
| 6,554,647 | B1 | 4/2003 | Cohen et al. |
| 6,565,387 | B2 | 5/2003 | Cohen |
| 6,565,390 | B2 | 5/2003 | Wu |
| 6,579,116 | B2 | 6/2003 | Brennan et al. |
| 6,582,244 | B2 | 6/2003 | Fogg et al. |
| 6,585,540 | B2 | 7/2003 | Gutierrez et al. |
| 6,592,381 | B2 | 7/2003 | Cohen et al. |
| 6,595,802 | B1 | 7/2003 | Watanabe et al. |
| 6,602,095 | B2 | 8/2003 | Astbury, Jr. et al. |
| 6,607,402 | B2 | 8/2003 | Cohen et al. |
| 6,608,762 | B2 | 8/2003 | Patriche |
| 6,609,933 | B2 | 8/2003 | Yamasaki |
| 6,612,871 | B1 | 9/2003 | Givens |
| 6,616,482 | B2 | 9/2003 | De La Cruz et al. |
| 6,616,864 | B1 | 9/2003 | Jiang et al. |
| 6,621,373 | B1 | 9/2003 | Mullen et al. |
| 6,652,318 | B1 | 11/2003 | Winings et al. |
| 6,652,319 | B1 | 11/2003 | Billman |
| 6,655,966 | B2 | 12/2003 | Rothermel et al. |
| 6,663,427 | B1 | 12/2003 | Billman et al. |
| 6,663,429 | B1 | 12/2003 | Korsunsky et al. |
| 6,692,272 | B2 | 2/2004 | Lemke et al. |
| 6,705,895 | B2 | 3/2004 | Hasircoglu |
| 6,706,974 | B2 | 3/2004 | Chen et al. |
| 6,709,294 | B1 | 3/2004 | Cohen et al. |
| 6,712,648 | B2 | 3/2004 | Padro et al. |
| 6,713,672 | B1 | 3/2004 | Stickney |
| 6,717,825 | B2 | 4/2004 | Volstorf |
| 6,722,897 | B1 | 4/2004 | Wu |
| 6,741,141 | B2 | 5/2004 | Kormanyos |
| 6,743,057 | B2 | 6/2004 | Davis et al. |
| 6,749,444 | B2 | 6/2004 | Murr et al. |
| 6,762,941 | B2 | 7/2004 | Roth |
| 6,764,341 | B2 | 7/2004 | Lappoehn |
| 6,776,645 | B2 | 8/2004 | Roth et al. |
| 6,776,659 | B1 | 8/2004 | Stokoe et al. |
| 6,786,771 | B2 | 9/2004 | Gailus |
| 6,792,941 | B2 | 9/2004 | Andersson |
| 6,806,109 | B2 | 10/2004 | Furuya et al. |
| 6,808,419 | B1 | 10/2004 | Korsunsky et al. |
| 6,808,420 | B2 | 10/2004 | Whiteman, Jr. et al. |
| 6,814,519 | B2 | 11/2004 | Policicchio et al. |
| 6,814,619 | B1 | 11/2004 | Stokoe et al. |
| 6,816,486 | B1 | 11/2004 | Rogers |
| 6,817,870 | B1 | 11/2004 | Kwong et al. |
| 6,823,587 | B2 | 11/2004 | Reed |
| 6,830,478 | B1 | 12/2004 | Ko et al. |
| 6,830,483 | B1 | 12/2004 | Wu |
| 6,830,489 | B2 | 12/2004 | Aoyama |
| 6,857,899 | B2 | 2/2005 | Reed et al. |
| 6,872,085 | B1 | 3/2005 | Cohen et al. |
| 6,875,031 | B1 | 4/2005 | Korsunsky et al. |
| 6,899,566 | B2 | 5/2005 | Kline et al. |
| 6,903,939 | B1 | 6/2005 | Chea, Jr. et al. |
| 6,913,490 | B2 | 7/2005 | Whiteman, Jr. et al. |
| 6,932,649 | B1 | 8/2005 | Rothermel et al. |
| 6,957,967 | B2 | 10/2005 | Petersen et al. |
| 6,960,103 | B2 | 11/2005 | Tokunaga |
| 6,971,916 | B2 | 12/2005 | Tokunaga |
| 6,979,202 | B2 | 12/2005 | Benham et al. |
| 6,979,226 | B2 | 12/2005 | Otsu et al. |
| 6,982,378 | B2 | 1/2006 | Dickson |
| 7,004,793 | B2 | 2/2006 | Scherer et al. |
| 7,021,969 | B2 | 4/2006 | Matsunaga |
| 7,044,794 | B2 | 5/2006 | Consoli et al. |
| 7,057,570 | B2 | 6/2006 | Irion, II et al. |
| 7,074,086 | B2 | 7/2006 | Cohen et al. |
| 7,094,102 | B2 | 8/2006 | Cohen et al. |
| 7,108,556 | B2 | 9/2006 | Cohen et al. |
| 7,120,327 | B2 | 10/2006 | Bozso et al. |
| 7,137,849 | B2 | 11/2006 | Nagata |

(56) References Cited

U.S. PATENT DOCUMENTS

| | | | |
|---|---|---|---|
| 7,163,421 B1 | 1/2007 | Cohen et al. | |
| 7,182,643 B2 | 2/2007 | Winings et al. | |
| 7,229,318 B2 | 6/2007 | Winings et al. | |
| 7,261,591 B2 | 8/2007 | Korsunsky et al. | |
| 7,270,573 B2 | 9/2007 | Houtz | |
| 7,285,018 B2 | 10/2007 | Kenny et al. | |
| 7,303,427 B2 | 12/2007 | Swain | |
| 7,309,239 B2 | 12/2007 | Shuey et al. | |
| 7,309,257 B1 | 12/2007 | Minich | |
| 7,316,585 B2 | 1/2008 | Smith et al. | |
| 7,322,855 B2 | 1/2008 | Mongold et al. | |
| 7,331,830 B2 | 2/2008 | Minich | |
| 7,335,063 B2 | 2/2008 | Cohen et al. | |
| 7,347,721 B2 | 3/2008 | Kameyama | |
| 7,351,114 B2 | 4/2008 | Benham et al. | |
| 7,354,274 B2 | 4/2008 | Minich | |
| 7,365,269 B2 | 4/2008 | Donazzi et al. | |
| 7,371,117 B2 * | 5/2008 | Gailus .................. | H01R 13/719 439/607.08 |
| 7,390,218 B2 | 6/2008 | Smith et al. | |
| 7,390,220 B1 | 6/2008 | Wu | |
| 7,407,413 B2 | 8/2008 | Minich | |
| 7,494,383 B2 | 2/2009 | Cohen et al. | |
| 7,540,781 B2 | 6/2009 | Kenny et al. | |
| 7,554,096 B2 | 6/2009 | Ward et al. | |
| 7,581,990 B2 | 9/2009 | Kirk et al. | |
| 7,585,186 B2 | 9/2009 | McAlonis et al. | |
| 7,588,464 B2 | 9/2009 | Kim | |
| 7,588,467 B2 | 9/2009 | Chang | |
| 7,594,826 B2 | 9/2009 | Kobayashi et al. | |
| 7,604,490 B2 | 10/2009 | Chen et al. | |
| 7,604,502 B2 | 10/2009 | Pan | |
| 7,674,133 B2 | 3/2010 | Fogg et al. | |
| 7,690,946 B2 | 4/2010 | Knaub et al. | |
| 7,699,644 B2 | 4/2010 | Szczesny et al. | |
| 7,699,663 B1 | 4/2010 | Little et al. | |
| 7,722,401 B2 | 5/2010 | Kirk et al. | |
| 7,731,537 B2 | 6/2010 | Amleshi et al. | |
| 7,753,731 B2 | 7/2010 | Cohen et al. | |
| 7,758,357 B2 | 7/2010 | Pan et al. | |
| 7,771,233 B2 | 8/2010 | Gailus | |
| 7,789,676 B2 | 9/2010 | Morgan et al. | |
| 7,794,240 B2 | 9/2010 | Cohen et al. | |
| 7,794,278 B2 | 9/2010 | Cohen et al. | |
| 7,806,729 B2 | 10/2010 | Nguyen et al. | |
| 7,828,595 B2 | 11/2010 | Mathews | |
| 7,833,068 B2 | 11/2010 | Bright et al. | |
| 7,871,296 B2 | 1/2011 | Fowler et al. | |
| 7,874,873 B2 | 1/2011 | Do et al. | |
| 7,887,371 B2 | 2/2011 | Kenny et al. | |
| 7,887,379 B2 | 2/2011 | Kirk | |
| 7,906,730 B2 | 3/2011 | Atkinson et al. | |
| 7,914,304 B2 | 3/2011 | Cartier et al. | |
| 7,927,143 B2 | 4/2011 | Helster et al. | |
| 7,985,097 B2 | 7/2011 | Gulla | |
| 8,018,733 B2 | 9/2011 | Jia | |
| 8,057,267 B2 | 11/2011 | Johnescu | |
| 8,083,553 B2 | 12/2011 | Manter et al. | |
| 8,167,631 B2 | 5/2012 | Ito et al. | |
| 8,182,289 B2 | 5/2012 | Stokoe et al. | |
| 8,215,968 B2 | 7/2012 | Cartier et al. | |
| 8,216,001 B2 | 7/2012 | Kirk | |
| 8,251,745 B2 | 8/2012 | Johnescu et al. | |
| 8,267,721 B2 | 9/2012 | Minich | |
| 8,272,877 B2 | 9/2012 | Stokoe et al. | |
| 8,328,565 B2 | 12/2012 | Westman et al. | |
| 8,348,701 B1 | 1/2013 | Lan et al. | |
| 8,371,875 B2 | 2/2013 | Gailus | |
| 8,382,524 B2 | 2/2013 | Khilchenko et al. | |
| 8,475,209 B1 * | 7/2013 | Whiteman, Jr. ... | H01R 13/6586 439/607.07 |
| 8,545,240 B2 | 10/2013 | Casher et al. | |
| 8,550,861 B2 | 10/2013 | Cohen et al. | |
| 8,657,627 B2 | 2/2014 | McNamara et al. | |
| 8,678,860 B2 | 3/2014 | Minich et al. | |
| 8,715,003 B2 | 5/2014 | Buck et al. | |
| 8,715,005 B2 | 5/2014 | Pan | |
| 8,764,460 B2 | 7/2014 | Smink et al. | |
| 8,764,488 B2 | 7/2014 | Zeng | |
| 8,771,016 B2 | 7/2014 | Atkinson et al. | |
| 8,864,521 B2 | 10/2014 | Atkinson et al. | |
| 8,926,377 B2 | 1/2015 | Kirk et al. | |
| 8,944,831 B2 | 2/2015 | Stoner et al. | |
| 8,944,863 B1 | 2/2015 | Yang | |
| 8,998,642 B2 | 4/2015 | Manter et al. | |
| 9,004,942 B2 | 4/2015 | Paniauqa | |
| 9,011,177 B2 | 4/2015 | Lloyd et al. | |
| 9,022,806 B2 | 5/2015 | Cartier, Jr. et al. | |
| 9,028,201 B2 | 5/2015 | Kirk et al. | |
| 9,028,281 B2 | 5/2015 | Kirk et al. | |
| 9,065,230 B2 | 6/2015 | Milbrand, Jr. | |
| 9,077,115 B2 | 7/2015 | Yang | |
| 9,083,130 B2 | 7/2015 | Casher et al. | |
| 9,124,009 B2 | 9/2015 | Atkinson et al. | |
| 9,166,317 B2 | 10/2015 | Briant et al. | |
| 9,219,335 B2 | 12/2015 | Atkinson et al. | |
| 9,225,083 B2 | 12/2015 | Krenceski et al. | |
| 9,225,085 B2 | 12/2015 | Cartier, Jr. et al. | |
| 9,257,778 B2 | 2/2016 | Buck et al. | |
| 9,257,794 B2 | 2/2016 | Wanha et al. | |
| 9,300,074 B2 | 3/2016 | Gailus | |
| 9,401,570 B2 | 7/2016 | Phillips et al. | |
| 9,450,344 B2 | 9/2016 | Cartier, Jr. et al. | |
| 9,461,378 B1 | 10/2016 | Chen | |
| 9,484,674 B2 | 11/2016 | Cartier, Jr. et al. | |
| 9,490,585 B2 | 11/2016 | Yang | |
| 9,490,587 B1 * | 11/2016 | Phillips .............. | H01R 13/6587 |
| 9,509,101 B2 | 11/2016 | Cartier, Jr. et al. | |
| 9,520,689 B2 | 12/2016 | Cartier, Jr. et al. | |
| 9,634,432 B2 | 4/2017 | Su et al. | |
| 9,692,183 B2 | 6/2017 | Phillips | |
| 9,692,188 B2 | 6/2017 | Godana et al. | |
| 9,705,218 B2 | 7/2017 | Ito | |
| 9,705,255 B2 | 7/2017 | Atkinson et al. | |
| 9,742,132 B1 | 8/2017 | Hsueh | |
| 9,748,698 B1 * | 8/2017 | Morgan ............. | H01R 13/6587 |
| 9,831,588 B2 | 11/2017 | Cohen | |
| 9,843,135 B2 | 12/2017 | Guetig et al. | |
| 9,899,774 B2 | 2/2018 | Gailus | |
| 9,923,309 B1 | 3/2018 | Aizawa et al. | |
| 9,972,945 B1 | 5/2018 | Huang et al. | |
| 9,979,136 B1 | 5/2018 | Wu et al. | |
| 9,985,389 B1 | 5/2018 | Morgan et al. | |
| 10,038,284 B2 | 7/2018 | Krenceski et al. | |
| 10,096,921 B2 | 10/2018 | Johnescu et al. | |
| 10,122,129 B2 | 11/2018 | Milbrand, Jr. et al. | |
| 10,128,616 B2 * | 11/2018 | Morgan ............... | H01R 13/424 |
| 10,148,025 B1 | 12/2018 | Trout et al. | |
| 10,186,814 B2 | 1/2019 | Khilchenko et al. | |
| 10,205,286 B2 | 2/2019 | Provencher et al. | |
| 10,211,577 B2 | 2/2019 | Milbrand, Jr. et al. | |
| 10,218,108 B2 * | 2/2019 | Scholeno ........... | H01R 13/6587 |
| 10,243,304 B2 | 3/2019 | Kirk et al. | |
| 10,270,191 B1 | 4/2019 | Li et al. | |
| 10,283,910 B1 | 5/2019 | Chen et al. | |
| 10,348,040 B2 | 7/2019 | Cartier et al. | |
| 10,355,416 B1 | 7/2019 | Pickel et al. | |
| 10,381,767 B1 | 8/2019 | Milbrand, Jr. et al. | |
| 10,431,936 B2 | 10/2019 | Horning et al. | |
| 10,446,983 B2 | 10/2019 | Krenceski et al. | |
| 10,511,128 B2 | 12/2019 | Kirk et al. | |
| 10,601,181 B2 | 3/2020 | Lu et al. | |
| 10,720,735 B2 | 7/2020 | Provencher et al. | |
| 10,777,921 B2 | 9/2020 | Lu et al. | |
| 10,797,417 B2 | 10/2020 | Scholeno et al. | |
| 10,847,936 B2 | 11/2020 | Tang et al. | |
| 10,916,894 B2 | 2/2021 | Kirk et al. | |
| 10,931,050 B2 | 2/2021 | Cohen | |
| 10,938,162 B2 | 3/2021 | Lin | |
| 10,965,063 B2 | 3/2021 | Krenceski et al. | |
| 11,189,971 B2 | 11/2021 | Lu | |
| 11,251,558 B1 | 2/2022 | Lee | |
| 11,316,307 B2 | 4/2022 | Chen et al. | |
| 11,381,039 B2 | 7/2022 | Hsiao et al. | |

(56) References Cited

U.S. PATENT DOCUMENTS

| | | | |
|---|---|---|---|
| 11,469,553 | B2 | 10/2022 | Johnescu et al. |
| 11,469,554 | B2 | 10/2022 | Ellison et al. |
| 11,522,310 | B2 | 12/2022 | Cohen |
| 11,539,171 | B2 | 12/2022 | Kirk et al. |
| 11,600,950 | B2 | 3/2023 | Takai et al. |
| 11,715,914 | B2 | 8/2023 | Cartier, Jr. et al. |
| 11,757,224 | B2 | 9/2023 | Milbrand, Jr. et al. |
| 11,799,246 | B2 | 10/2023 | Johnescu et al. |
| 11,817,655 | B2 | 11/2023 | Liu et al. |
| 11,817,657 | B2 | 11/2023 | Ellison et al. |
| 2001/0012730 | A1 | 8/2001 | Ramey et al. |
| 2001/0041477 | A1 | 11/2001 | Billman et al. |
| 2001/0042632 | A1 | 11/2001 | Manov et al. |
| 2001/0046810 | A1 | 11/2001 | Cohen et al. |
| 2002/0042223 | A1 | 4/2002 | Belopolsky et al. |
| 2002/0086582 | A1 | 7/2002 | Nitta et al. |
| 2002/0089464 | A1 | 7/2002 | Joshi |
| 2002/0098738 | A1 | 7/2002 | Astbury et al. |
| 2002/0102885 | A1 | 8/2002 | Kline |
| 2002/0111068 | A1 | 8/2002 | Cohen et al. |
| 2002/0111069 | A1 | 8/2002 | Astbury et al. |
| 2002/0115335 | A1 | 8/2002 | Saito |
| 2002/0123266 | A1 | 9/2002 | Ramey et al. |
| 2002/0136506 | A1 | 9/2002 | Asada et al. |
| 2002/0146926 | A1 | 10/2002 | Fogg et al. |
| 2002/0168898 | A1 | 11/2002 | Billman et al. |
| 2002/0172469 | A1 | 11/2002 | Benner et al. |
| 2002/0181215 | A1 | 12/2002 | Guenthner |
| 2002/0192988 | A1 | 12/2002 | Droesbeke et al. |
| 2003/0003803 | A1 | 1/2003 | Billman et al. |
| 2003/0008561 | A1 | 1/2003 | Lappoehn |
| 2003/0008562 | A1 | 1/2003 | Yamasaki |
| 2003/0022555 | A1 | 1/2003 | Vicich et al. |
| 2003/0027439 | A1 | 2/2003 | Johnescu et al. |
| 2003/0109174 | A1 | 6/2003 | Korsunsky et al. |
| 2003/0143894 | A1 | 7/2003 | Kline et al. |
| 2003/0147227 | A1 | 8/2003 | Egitto et al. |
| 2003/0162441 | A1 | 8/2003 | Nelson et al. |
| 2003/0220018 | A1 | 11/2003 | Winings et al. |
| 2003/0220021 | A1 | 11/2003 | Whiteman et al. |
| 2004/0001299 | A1 | 1/2004 | van Haaster et al. |
| 2004/0005815 | A1 | 1/2004 | Mizumura et al. |
| 2004/0020674 | A1 | 2/2004 | McFadden et al. |
| 2004/0043661 | A1 | 3/2004 | Okada et al. |
| 2004/0072473 | A1 | 4/2004 | Wu |
| 2004/0097112 | A1 | 5/2004 | Minich et al. |
| 2004/0115968 | A1 | 6/2004 | Cohen |
| 2004/0121652 | A1 | 6/2004 | Gailus |
| 2004/0171305 | A1 | 9/2004 | McGowan et al. |
| 2004/0196112 | A1 | 10/2004 | Welbon et al. |
| 2004/0224559 | A1 | 11/2004 | Nelson et al. |
| 2004/0235352 | A1 | 11/2004 | Takemasa |
| 2004/0259419 | A1 | 12/2004 | Payne et al. |
| 2005/0006119 | A1 | 1/2005 | Cunningham et al. |
| 2005/0020135 | A1 | 1/2005 | Whiteman et al. |
| 2005/0039331 | A1 | 2/2005 | Smith |
| 2005/0048838 | A1 | 3/2005 | Korsunsky et al. |
| 2005/0048842 | A1 | 3/2005 | Benham et al. |
| 2005/0070160 | A1 | 3/2005 | Cohen et al. |
| 2005/0090299 | A1 | 4/2005 | Tsao et al. |
| 2005/0133245 | A1 | 6/2005 | Katsuyama et al. |
| 2005/0148239 | A1 | 7/2005 | Hull et al. |
| 2005/0176300 | A1 | 8/2005 | Hsu et al. |
| 2005/0176835 | A1 | 8/2005 | Kobayashi et al. |
| 2005/0215121 | A1 | 9/2005 | Tokunaga |
| 2005/0233610 | A1 | 10/2005 | Tutt et al. |
| 2005/0277315 | A1 | 12/2005 | Mongold et al. |
| 2005/0283974 | A1 | 12/2005 | Richard et al. |
| 2005/0287869 | A1 | 12/2005 | Kenny et al. |
| 2006/0009080 | A1 | 1/2006 | Regnier et al. |
| 2006/0019517 | A1 | 1/2006 | Raistrick et al. |
| 2006/0019538 | A1 | 1/2006 | Davis et al. |
| 2006/0024983 | A1 | 2/2006 | Cohen et al. |
| 2006/0024984 | A1 | 2/2006 | Cohen et al. |
| 2006/0068640 | A1 | 3/2006 | Gailus |
| 2006/0073709 | A1 | 4/2006 | Reid |
| 2006/0104010 | A1 | 5/2006 | Donazzi et al. |
| 2006/0110977 | A1 | 5/2006 | Matthews |
| 2006/0141866 | A1 | 6/2006 | Shiu |
| 2006/0166551 | A1 | 7/2006 | Korsunsky et al. |
| 2006/0216969 | A1 | 9/2006 | Bright et al. |
| 2006/0255876 | A1 | 11/2006 | Kushta et al. |
| 2006/0292932 | A1 | 12/2006 | Benham et al. |
| 2007/0004282 | A1 | 1/2007 | Cohen et al. |
| 2007/0004828 | A1 | 1/2007 | Khabbaz |
| 2007/0021000 | A1 | 1/2007 | Laurx |
| 2007/0021001 | A1 | 1/2007 | Laurx et al. |
| 2007/0021002 | A1 | 1/2007 | Laurx et al. |
| 2007/0021003 | A1 | 1/2007 | Laurx et al. |
| 2007/0021004 | A1 | 1/2007 | Laurx et al. |
| 2007/0037419 | A1 | 2/2007 | Sparrowhawk |
| 2007/0042639 | A1 | 2/2007 | Manter et al. |
| 2007/0054554 | A1 | 3/2007 | Do et al. |
| 2007/0059961 | A1 | 3/2007 | Cartier et al. |
| 2007/0111597 | A1 | 5/2007 | Kondou et al. |
| 2007/0141872 | A1 | 6/2007 | Szczesny et al. |
| 2007/0155241 | A1 | 7/2007 | Lappohn |
| 2007/0218765 | A1 | 9/2007 | Cohen et al. |
| 2007/0275583 | A1 | 11/2007 | McNutt et al. |
| 2008/0050968 | A1 | 2/2008 | Chang |
| 2008/0194146 | A1 | 8/2008 | Gailus |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2008/0318455 | A1 | 12/2008 | Beaman et al. |
| 2009/0011641 | A1 | 1/2009 | Cohen et al. |
| 2009/0011643 | A1 | 1/2009 | Amleshi et al. |
| 2009/0011645 | A1 | 1/2009 | Laurx et al. |
| 2009/0029602 | A1 | 1/2009 | Cohen et al. |
| 2009/0035955 | A1 | 2/2009 | McNamara |
| 2009/0061661 | A1 | 3/2009 | Shuey et al. |
| 2009/0117386 | A1 | 5/2009 | Vacanti et al. |
| 2009/0124101 | A1 | 5/2009 | Minich et al. |
| 2009/0149045 | A1 | 6/2009 | Chen et al. |
| 2009/0203259 | A1 | 8/2009 | Nguyen et al. |
| 2009/0239395 | A1 | 9/2009 | Cohen et al. |
| 2009/0258516 | A1 | 10/2009 | Hiew et al. |
| 2009/0291593 | A1 | 11/2009 | Atkinson et al. |
| 2009/0305530 | A1 | 12/2009 | Ito et al. |
| 2009/0305533 | A1 | 12/2009 | Feldman et al. |
| 2009/0305553 | A1 | 12/2009 | Thomas et al. |
| 2010/0048058 | A1 | 2/2010 | Morgan et al. |
| 2010/0081302 | A1 | 4/2010 | Atkinson et al. |
| 2010/0099299 | A1 | 4/2010 | Moriyama et al. |
| 2010/0144167 | A1 | 6/2010 | Fedder et al. |
| 2010/0273359 | A1 | 10/2010 | Walker et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0067237 | A1 | 3/2011 | Cohen et al. |
| 2011/0104948 | A1 | 5/2011 | Girard, Jr. et al. |
| 2011/0130038 | A1 | 6/2011 | Cohen et al. |
| 2011/0212649 | A1 | 9/2011 | Stokoe et al. |
| 2011/0212650 | A1 | 9/2011 | Amleshi et al. |
| 2011/0230095 | A1 | 9/2011 | Atkinson et al. |
| 2011/0230096 | A1 | 9/2011 | Atkinson et al. |
| 2011/0256739 | A1 | 10/2011 | Toshiyuki et al. |
| 2011/0287663 | A1 | 11/2011 | Gailus et al. |
| 2012/0077380 | A1 | 3/2012 | Minich et al. |
| 2012/0094536 | A1 | 4/2012 | Khilchenko et al. |
| 2012/0115371 | A1 | 5/2012 | Chuang et al. |
| 2012/0156929 | A1 | 6/2012 | Manter et al. |
| 2012/0184154 | A1 | 7/2012 | Frank et al. |
| 2012/0202363 | A1 | 8/2012 | McNamara et al. |
| 2012/0202386 | A1 | 8/2012 | McNamara et al. |
| 2012/0202387 | A1 | 8/2012 | McNamara |
| 2012/0214343 | A1 | 8/2012 | Buck et al. |
| 2012/0214344 | A1 | 8/2012 | Cohen et al. |
| 2013/0012038 | A1 | 1/2013 | Kirk et al. |
| 2013/0017733 | A1 | 1/2013 | Kirk et al. |
| 2013/0065454 | A1 | 3/2013 | Milbrand Jr. |
| 2013/0078870 | A1 | 3/2013 | Milbrand, Jr. |
| 2013/0078871 | A1 | 3/2013 | Milbrand, Jr. |

(56) References Cited

U.S. PATENT DOCUMENTS

| | | | |
|---|---|---|---|
| 2013/0090001 | A1 | 4/2013 | Kagotani |
| 2013/0109232 | A1 | 5/2013 | Paniaqua |
| 2013/0143442 | A1 | 6/2013 | Cohen et al. |
| 2013/0196553 | A1 | 8/2013 | Gailus |
| 2013/0217263 | A1 | 8/2013 | Pan |
| 2013/0225006 | A1 | 8/2013 | Khilchenko et al. |
| 2013/0237092 | A1 | 9/2013 | Rubens |
| 2013/0273781 | A1 | 10/2013 | Buck et al. |
| 2013/0288513 | A1 | 10/2013 | Masubuchi et al. |
| 2013/0316590 | A1 | 11/2013 | Fan et al. |
| 2013/0340251 | A1 | 12/2013 | Regnier et al. |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0057498 | A1 | 2/2014 | Cohen |
| 2014/0273557 | A1 | 9/2014 | Cartier, Jr. et al. |
| 2014/0273627 | A1 | 9/2014 | Cartier, Jr. et al. |
| 2015/0056856 | A1 | 2/2015 | Atkinson et al. |
| 2015/0111427 | A1 | 4/2015 | Wu et al. |
| 2015/0188250 | A1 | 7/2015 | Liu et al. |
| 2015/0236451 | A1 | 8/2015 | Cartier, Jr. et al. |
| 2015/0236452 | A1 | 8/2015 | Cartier, Jr. et al. |
| 2015/0255926 | A1 | 9/2015 | Paniagua |
| 2015/0380868 | A1 | 12/2015 | Chen et al. |
| 2016/0000616 | A1 | 1/2016 | Lavoie |
| 2016/0134057 | A1 | 5/2016 | Buck et al. |
| 2016/0149343 | A1 | 5/2016 | Atkinson et al. |
| 2016/0156133 | A1 | 6/2016 | Masubuchi et al. |
| 2016/0172794 | A1 | 6/2016 | Sparrowhawk et al. |
| 2016/0211618 | A1 | 7/2016 | Gailus |
| 2017/0352970 | A1 | 12/2017 | Liang et al. |
| 2018/0062323 | A1 | 3/2018 | Kirk et al. |
| 2018/0109043 | A1 | 4/2018 | Provencher et al. |
| 2018/0145438 | A1 | 5/2018 | Cohen |
| 2018/0166828 | A1 | 6/2018 | Gailus |
| 2018/0198220 | A1 | 7/2018 | Sasame et al. |
| 2018/0205177 | A1 | 7/2018 | Zhou et al. |
| 2018/0212376 | A1 | 7/2018 | Wang et al. |
| 2018/0219331 | A1 | 8/2018 | Cartier et al. |
| 2018/0269607 | A1 | 9/2018 | Wu et al. |
| 2019/0036256 | A1 | 1/2019 | Martens et al. |
| 2019/0052019 | A1 | 2/2019 | Huang et al. |
| 2019/0067854 | A1 | 2/2019 | Ju et al. |
| 2019/0131743 | A1 | 5/2019 | Hsu et al. |
| 2019/0173209 | A1 | 6/2019 | Lu et al. |
| 2019/0173232 | A1 | 6/2019 | Lu et al. |
| 2019/0221973 | A1 | 7/2019 | Kirk et al. |
| 2019/0312389 | A1 | 10/2019 | Little |
| 2019/0334292 | A1 | 10/2019 | Cartier et al. |
| 2020/0021052 | A1 | 1/2020 | Milbrand, Jr. et al. |
| 2020/0076132 | A1 | 3/2020 | Yang et al. |
| 2020/0161811 | A1 | 5/2020 | Lu |
| 2020/0194940 | A1 | 6/2020 | Cohen et al. |
| 2020/0212632 | A1 | 7/2020 | Liong et al. |
| 2020/0220289 | A1 | 7/2020 | Scholeno et al. |
| 2020/0235529 | A1 | 7/2020 | Kirk et al. |
| 2020/0251841 | A1 | 8/2020 | Stokoe et al. |
| 2020/0259294 | A1 | 8/2020 | Lu |
| 2020/0266584 | A1 | 8/2020 | Lu |
| 2020/0315027 | A1 | 10/2020 | Muronoi et al. |
| 2020/0350717 | A1 | 11/2020 | Dong et al. |
| 2020/0350732 | A1 | 11/2020 | Hsueh et al. |
| 2020/0395698 | A1 | 12/2020 | Hou et al. |
| 2020/0403350 | A1 | 12/2020 | Hsu |
| 2020/0412060 | A1 | 12/2020 | Hsieh et al. |
| 2021/0036465 | A1 | 2/2021 | Tang et al. |
| 2021/0050683 | A1 | 2/2021 | Sasame et al. |
| 2021/0159643 | A1 | 5/2021 | Kirk et al. |
| 2021/0175670 | A1 | 6/2021 | Cartier, Jr. et al. |
| 2021/0194187 | A1 | 6/2021 | Chen et al. |
| 2021/0203096 | A1 | 7/2021 | Cohen |
| 2021/0234314 | A1 | 7/2021 | Johnescu et al. |
| 2021/0234315 | A1 | 7/2021 | Ellison et al. |
| 2021/0242632 | A1 | 8/2021 | Trout et al. |
| 2021/0320461 | A1 | 10/2021 | Buck et al. |
| 2021/0336362 | A1 | 10/2021 | Shen et al. |
| 2022/0094099 | A1 | 3/2022 | Liu et al. |
| 2022/0102916 | A1 | 3/2022 | Liu et al. |
| 2022/0399663 | A1 | 12/2022 | Chang et al. |
| 2022/0407269 | A1 | 12/2022 | Ellison et al. |
| 2023/0062661 | A1 | 3/2023 | Johnescu et al. |
| 2023/0099389 | A1 | 3/2023 | Cohen |
| 2023/0128519 | A1 | 4/2023 | Kirk et al. |
| 2023/0378695 | A1 | 11/2023 | Zeng |

FOREIGN PATENT DOCUMENTS

| | | | |
|---|---|---|---|
| CN | 1237652 | A | 12/1999 |
| CN | 1265470 | A | 9/2000 |
| CN | 2400938 | Y | 10/2000 |
| CN | 1276597 | A | 12/2000 |
| CN | 1280405 | A | 1/2001 |
| CN | 1299524 | A | 6/2001 |
| CN | 2513247 | Y | 9/2002 |
| CN | 2519434 | Y | 10/2002 |
| CN | 2519458 | Y | 10/2002 |
| CN | 2519592 | Y | 10/2002 |
| CN | 1394829 | A | 2/2003 |
| CN | 1398446 | A | 2/2003 |
| CN | 1401147 | A | 3/2003 |
| CN | 1471749 | A | 1/2004 |
| CN | 1489810 | A | 4/2004 |
| CN | 1491465 | A | 4/2004 |
| CN | 1502151 | A | 6/2004 |
| CN | 1516723 | A | 7/2004 |
| CN | 1179448 | C | 12/2004 |
| CN | 1561565 | A | 1/2005 |
| CN | 1203341 | C | 5/2005 |
| CN | 1639866 | A | 7/2005 |
| CN | 1650479 | A | 8/2005 |
| CN | 1764020 | A | 4/2006 |
| CN | 1799290 | A | 7/2006 |
| CN | 2798361 | Y | 7/2006 |
| CN | 2865050 | Y | 1/2007 |
| CN | 1985199 | A | 6/2007 |
| CN | 101032060 | A | 9/2007 |
| CN | 201000949 | Y | 1/2008 |
| CN | 101124697 | A | 2/2008 |
| CN | 101176389 | A | 5/2008 |
| CN | 101208837 | A | 6/2008 |
| CN | 101273501 | A | 9/2008 |
| CN | 201112782 | Y | 9/2008 |
| CN | 101312275 | A | 11/2008 |
| CN | 101316012 | A | 12/2008 |
| CN | 201222548 | Y | 4/2009 |
| CN | 201252183 | Y | 6/2009 |
| CN | 101552410 | A | 10/2009 |
| CN | 101600293 | A | 12/2009 |
| CN | 201374433 | Y | 12/2009 |
| CN | 101752700 | A | 6/2010 |
| CN | 101790818 | A | 7/2010 |
| CN | 101120490 | B | 11/2010 |
| CN | 101964463 | A | 2/2011 |
| CN | 101124697 | B | 3/2011 |
| CN | 201846527 | U | 5/2011 |
| CN | 102106041 | A | 6/2011 |
| CN | 102195173 | A | 9/2011 |
| CN | 102232259 | A | 11/2011 |
| CN | 102239605 | A | 11/2011 |
| CN | 102282731 | A | 12/2011 |
| CN | 102292881 | A | 12/2011 |
| CN | 101600293 | B | 5/2012 |
| CN | 102570100 | A | 7/2012 |
| CN | 102598430 | A | 7/2012 |
| CN | 101258649 | B | 9/2012 |
| CN | 102738621 | A | 10/2012 |
| CN | 102176586 | B | 11/2012 |
| CN | 102859805 | A | 1/2013 |
| CN | 102882097 | A | 1/2013 |
| CN | 202695788 | U | 1/2013 |
| CN | 202695861 | U | 1/2013 |
| CN | 102986091 | A | 3/2013 |
| CN | 103036081 | A | 4/2013 |
| CN | 103594871 | A | 2/2014 |

(56) References Cited

FOREIGN PATENT DOCUMENTS

| | | | |
|---|---|---|---|
| CN | 204190038 | U | 3/2015 |
| CN | 104577577 | A | 4/2015 |
| CN | 205212085 | U | 5/2016 |
| CN | 102820589 | B | 8/2016 |
| CN | 106099546 | A | 11/2016 |
| CN | 107069274 | A | 8/2017 |
| CN | 107069293 | A | 8/2017 |
| CN | 304240766 | S | 8/2017 |
| CN | 304245430 | S | 8/2017 |
| CN | 206712089 | U | 12/2017 |
| CN | 207677189 | U | 7/2018 |
| CN | 108832338 | A | 11/2018 |
| CN | 109994892 | A | 7/2019 |
| CN | 111555069 | A | 8/2020 |
| CN | 112134095 | A | 12/2020 |
| CN | 213636403 | U | 7/2021 |
| DE | 4109863 | A1 | 10/1992 |
| DE | 4238777 | A1 | 5/1993 |
| DE | 19853837 | C1 | 2/2000 |
| DE | 102006044479 | A1 | 5/2007 |
| DE | 60216728 | T2 | 11/2007 |
| EP | 0 560 551 | A1 | 9/1993 |
| EP | 0774807 | A2 | 5/1997 |
| EP | 0903816 | A2 | 3/1999 |
| EP | 1 018 784 | A1 | 7/2000 |
| EP | 1 779 472 | A1 | 5/2007 |
| EP | 1794845 | A1 | 6/2007 |
| EP | 2 169 770 | A2 | 3/2010 |
| EP | 2262061 | A1 | 12/2010 |
| EP | 2388867 | A2 | 11/2011 |
| EP | 2 405 537 | A1 | 1/2012 |
| EP | 1794845 | B1 | 3/2013 |
| GB | 1272347 | A | 4/1972 |
| GB | 2161658 | A | 1/1986 |
| GB | 2283620 | A | 5/1995 |
| HK | 1043254 | A1 | 9/2002 |
| JP | H05-54201 | A | 3/1993 |
| JP | H05-234642 | A | 9/1993 |
| JP | H07-57813 | A | 3/1995 |
| JP | 07302649 | A | 11/1995 |
| JP | H09-63703 | A | 3/1997 |
| JP | H09-274969 | A | 10/1997 |
| JP | 2711601 | B2 | 2/1998 |
| JP | H11-67367 | A | 3/1999 |
| JP | 2896836 | B2 | 5/1999 |
| JP | H11-233200 | A | 8/1999 |
| JP | H11-260497 | A | 9/1999 |
| JP | 2000-013081 | A | 1/2000 |
| JP | 2000-311749 | A | 11/2000 |
| JP | 2001-068888 | A | 3/2001 |
| JP | 2001-510627 | A | 7/2001 |
| JP | 2001-217052 | A | 8/2001 |
| JP | 2002-042977 | A | 2/2002 |
| JP | 2002-053757 | A | 2/2002 |
| JP | 2002-075052 | A | 3/2002 |
| JP | 2002-075544 | A | 3/2002 |
| JP | 2002-117938 | A | 4/2002 |
| JP | 2002-246107 | A | 8/2002 |
| JP | 2003-017193 | A | 1/2003 |
| JP | 2003-309395 | A | 10/2003 |
| JP | 2004-192939 | A | 7/2004 |
| JP | 2004-259621 | A | 9/2004 |
| JP | 3679470 | B2 | 8/2005 |
| JP | 2006-344524 | A | 12/2006 |
| JP | 2008-515167 | A | 5/2008 |
| JP | 2009-043717 | A | 2/2009 |
| JP | 2009-110956 | A | 5/2009 |
| MX | 9907324 | A1 | 8/2000 |
| TW | 466650 | B | 12/2001 |
| TW | 517002 | B | 1/2003 |
| TW | 534494 | U | 5/2003 |
| TW | 200501874 | A | 1/2005 |
| TW | 200515773 | A | 5/2005 |
| TW | M274675 | U | 9/2005 |
| TW | M329891 | U | 4/2008 |
| TW | M357771 | U | 5/2009 |
| TW | 200926536 | A | 6/2009 |
| TW | M403141 | U | 5/2011 |
| TW | M494411 | U | 1/2015 |
| TW | I475770 | B | 3/2015 |
| TW | M509998 | U | 10/2015 |
| TW | M518837 | U | 3/2016 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | 201820724 | A | 6/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M623128 | U | 2/2022 |
| WO | WO 85/02265 | A1 | 5/1985 |
| WO | WO 88/05218 | A1 | 7/1988 |
| WO | WO 98/35409 | A1 | 8/1998 |
| WO | WO 01/39332 | A1 | 5/2001 |
| WO | WO 01/57963 | A2 | 8/2001 |
| WO | WO 2002/061892 | A1 | 8/2002 |
| WO | WO 03/013199 | A2 | 2/2003 |
| WO | WO 03/047049 | A1 | 6/2003 |
| WO | WO 2004/034539 | A1 | 4/2004 |
| WO | WO 2004/051809 | A2 | 6/2004 |
| WO | WO 2004/059794 | A2 | 7/2004 |
| WO | WO 2004/059801 | A1 | 7/2004 |
| WO | WO 2004/114465 | A2 | 12/2004 |
| WO | WO 2005/011062 | A2 | 2/2005 |
| WO | WO 2005/114274 | A1 | 12/2005 |
| WO | WO 2006/039277 | A1 | 4/2006 |
| WO | WO 2007/005597 | A2 | 1/2007 |
| WO | WO 2007/005598 | A2 | 1/2007 |
| WO | WO 2007/005599 | A1 | 1/2007 |
| WO | WO 2008/124052 | A2 | 10/2008 |
| WO | WO 2008/124054 | A2 | 10/2008 |
| WO | WO 2008/124057 | A1 | 10/2008 |
| WO | WO 2008/124101 | A2 | 10/2008 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/060236 | A1 | 5/2011 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |
| WO | WO 2011/140438 | A3 | 12/2011 |
| WO | WO 2012/106554 | A2 | 8/2012 |
| WO | WO 2013/059317 | A1 | 4/2013 |
| WO | WO 2015/112717 | A1 | 7/2015 |
| WO | WO 2016/008473 | A1 | 1/2016 |
| WO | WO 2018/039164 | A1 | 3/2018 |

OTHER PUBLICATIONS

Chinese Office Action for Chinese Application No. 201580014851.4 dated Sep. 4, 2019.

Chinese Office Action for Chinese Application No. 201780064531.9 dated Jan. 2, 2020.

Extended European Search Report for European Application No. EP 11166820.8 mailed Jan. 24, 2012.

International Preliminary Report on Patentability for International Application No. PCT/US2010/056482 mailed May 24, 2012.

International Search Report and Written Opinion for International Application No. PCT/US2010/056482 mailed Mar. 14, 2011.

International Preliminary Report on Patentability for International Application No. PCT/US2011/026139 mailed Sep. 7, 2012.

International Search Report and Written Opinion for International Application No. PCT/US2011/026139 mailed Nov. 22, 2011.

International Preliminary Report on Patentability for International Application No. PCT/US2012/023689 mailed Aug. 15, 2013.

(56) References Cited

OTHER PUBLICATIONS

International Search Report and Written Opinion for International Application No. PCT/US2012/023689 mailed Sep. 12, 2012.
International Search Report and Written Opinion for International Application No. PCT/US2012/060610 mailed Mar. 29, 2013.
International Search Report and Written Opinion for International Application No. PCT/US2015/012463 mailed May 13, 2015.
International Preliminary Report on Patentability for International Application No. PCT/US2017/047905 mailed Mar. 7, 2019.
International Search Report and Written Opinion for International Application No. PCT/US2017/047905 dated Dec. 4, 2017.
International Search Report and Written Opinion for International Application No. PCT/US2005/034605 mailed Jan. 26, 2006.
International Search Report with Written Opinion for International Application No. PCT/US2006/025562 mailed Oct. 31, 2007.
International Search Report and Written Opinion for International Application No. PCT/US2011/034747 mailed Jul. 28, 2011.
[No Author Listed], Carbon Nanotubes For Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.
[No Author Listed], High Speed Backplane Connectors. Tyco Electronics. Product Catalog No. 1773095. Revised Dec. 2008. 1-40 pages.
[No Author Listed], Military Fibre Channel High Speed Cable Assembly. www.gore.com. 2008. [last accessed Aug. 2, 2012 via Internet Archive: Wayback Machine http://web.archive.org] Link archived: http://www.gore.com/en.sub.--xx/products/cables/copper/networking/militar-y/military.sub.--fibre . . . Last archive date Apr. 6, 2008.
Beaman, High Performance Mainframe Computer Cables. 1997 Electronic Components and Technology Conference. 1997;911-7.
Reich et al., Microwave Theory and Techniques. Boston Technical Publishers, Inc. 1965;182-91.
Shi et al., Improving Signal Integrity In Circuit Boards By Incorporating Absorbing Materials. 2001 Proceedings. 51st Electronic Components and Technology Conference, Orlando FL. 2001:1451-56.
U.S. Appl. No. 15/823,494, filed Nov. 27, 2017, Cohen.
U.S. Appl. No. 16/505,290, filed Jul. 8, 2019, Cartier et al.
U.S. Appl. No. 16/518,362, filed Jan. 16, 2020, Milbrand, Jr. et al.
U.S. Appl. No. 16/716,157, filed Dec. 16, 2019, Kirk et al.
CN 201580014851.4, Sep. 4, 2019, Chinese Office Action.
CN 201580014851.4, Jun. 1, 2020, Chinese communiction.
CN201780064531.9, Jan. 2, 2020, Chinese Office Action.
EP 11166820.8, Jan. 24, 2012, Extended European Search Report.
PCT/US2005/034605, Jan. 26, 2006, International Search Report and Written Opinion.
PCT/US2006/025562, Oct. 31, 2007, International Search Report and Written Opinion.
PCT/US2010/056482, Mar. 14, 2011, International Search Report and Written Opinion.
PCT/US2010/056482, May 24, 2012, International Preliminary Report on Patentability.
PCT/US2011/026139, Nov. 22, 2011, International Search Report and Written Opinion.
PCT/US2011/026139, Sep. 7, 2012, International Preliminary Report on Patentability.
PCT/US2011/034747, Jul. 28, 2011, International Search Report and Written Opinion.
PCT/US2012/023689, Sep. 12, 2012, International Search Report and Written Opinion.
PCT/US2012/023689, Aug. 15, 2013, International Preliminary Report on Patentability.
PCT/US2012/060610, Mar. 29, 2013, International Search Report and Written Opinion.
PCT/US2015/012463, May 13, 2015, International Search Report and Written Opinion.
PCT/US2017/047905, Dec. 4, 2017, International Search Report and Written Opinion.
PCT/US2017/047905, Mar. 7, 2019, International Preliminary Report on Patentability.
Chinese Invalidation Request dated Aug. 17, 2021 in connection with Chinese Application No. 200580040906.5.
Chinese Invalidation Request dated Jun. 1, 2021 in connection with Chinese Application No. 200680023997.6.
Chinese Invalidation Request dated Sep. 9, 2021 in connection with Chinese Application No. 201110008089.2.
Chinese Invalidation Request dated Jun. 15, 2021 in connection with Chinese Application No. 201180033750.3.
Chinese Supplemental Observations dated Jun. 17, 2021 in connection with Chinese Application No. 201210249710.9.
Chinese Invalidation Request dated Mar. 17, 2021 in connection with Chinese Application No. 201610952606.4.
Chinese Office Action for Chinese Application No. 202010467444.1 dated Apr. 2, 2021.
Chinese Office Action for Chinese Application No. 202010825662.8 dated Sep. 3, 2021.
Chinese Office Action for Chinese Application No. 202010922401.8 dated Aug. 6, 2021.
International Search Report and Written Opinion mailed Dec. 28, 2021 in connection with International Application No. PCT/CN2021/119849.
International Preliminary Report on Patentability for International Application No. PCT/US2005/034605 dated Apr. 3, 2007.
International Preliminary Report on Patentability for International Application No. PCT/US2006/025562 dated Jan. 9, 2008.
International Preliminary Report on Patentability for International Application No. PCT/US2012/060610 mailed May 1, 2014.
International Preliminary Report on Patentability for International Application No. PCT/US2015/012463 mailed Aug. 4, 2016.
International Preliminary Report on Patentability Chapter II mailed Apr. 5, 2022 in connection with International Application No. PCT/US2021/015048.
International Search Report and Written Opinion mailed Jul. 1, 2021 in connection with International Application No. PCT/US2021/015048.
International Preliminary Report on Patentability Chapter II mailed Apr. 1, 2022 in connection with International Application No. PCT/US2021/015073.
International Search Report and Written Opinion mailed May 17, 2021 in connection with International Application No. PCT/US2021/015073.
Taiwanese Office Action dated Mar. 5, 2021 in connection with Taiwanese Application No. 106128439.
Taiwanese Office Action dated Mar. 15, 2022 in connection with Taiwanese Application No. 110140608.
Decision Invalidating CN Patent Application No. 201610952606.4, which issued as CN Utility Model Patent No. 107069274B, and Certified Translation.
In re Certain Electrical Connectors and Cages, Components Thereof, and Prods. Containing the Same, Inv. No. 337-TA-1241, Order No. 31 (Oct. 19, 2021): Construing Certain Terms of the Asserted Claims of the Patents at Issue.
In re Matter of Certain Electrical Connectors and Cages, Components Thereof, and Products Containing the Same, Inv. No. 337-TA-1241, Complainant Amphenol Corporation's Corrected Initial Post-Hearing Brief. Public Version. Jan. 5, 2022. 451 pages.
In re Matter of Certain Electrical Connectors and Cages, Components Thereof, and Products Containing the Same, Inv. No. 337-TA-1241, Complainant Amphenol Corporation's Post-Hearing Reply Brief. Public Version. Dec. 6, 2021. 159 pages.
In re Matter of Certain Electrical Connectors and Cages, Components Thereof, and Products Containing the Same, Inv. No. 337-TA-1241, Luxshare Respondents' Initial Post-Hearing Brief. Public Version. Nov. 23, 2021. 348 pages.
In re Matter of Certain Electrical Connectors and Cages, Components Thereof, and Products Containing the Same, Inv. No. 337-TA-1241, Luxshare Respondents' Reply Post-Hearing Brief. Public Version. Dec. 6, 2021. 165 pages.

(56) References Cited

OTHER PUBLICATIONS

In re Matter of Certain Electrical Connectors and Cages, Components Thereof, and Products Containing the Same, Inv. No. 337-TA-1241, Notice of Prior Art. Jun. 3, 2021. 319 pages.
In re Matter of Certain Electrical Connectors and Cages, Components Thereof, and Products Containing the Same, Inv. No. 337-TA-1241, Respondents' Pre-Hearing Brief. Redacted. Oct. 21, 2021. 219 pages.
In the Matter of Certain Electrical Connectors and Cages, Components Thereof, and Products Containing the Same, Inv. No. 337-TA-1241, Final Initial Determination on Violation of Section 337. Public Version. Mar. 11, 2022. 393 pages.
Invalidity Claim Charts Based on CN 201112782Y ("Cai"). Luxshare Respondents' Supplemental Responses to Interrogatories Nos. 13 and 14, Exhibit 25. May 7, 2021. 147 pages.
Invalidity Claim Charts Based on U.S. Pat. No. 6,179,651 ("Huang"). Luxshare Respondents' Supplemental Responses to Interrogatories Nos. 13 and 14, Exhibit 26. May 7, 2021. 153 pages.
Invalidity Claim Charts Based on U.S. Pat. No. 7,261,591 ("Korsunsky"). Luxshare Respondents' Supplemental Responses to Interrogatories Nos. 13 and 14, Exhibit 27. May 7, 2021. 150 pages.
Petition for Inter Partes Review. *Luxshare Precision Industry Co., Ltd* v. *Amphenol Corp*. U.S. Pat. No. 10,381,767. IPR2022-00132. Nov. 4, 2021. 112 pages.
[No Author Listed], All About ESD Plastics. Evaluation Engineering. Jul. 1, 1998. 8 pages. https://www.evaluationengineering.com/home/article/13001136/all-about-esdplastics [last accessed Mar. 14, 2021].
[No Author Listed], Amp Incorporated Schematic, Cable Assay, 2 Pair, HMZD. Oct. 3, 2002. 1 page.
[No Author Listed], Board to Backplane Electrical Connector. The Engineer. Mar. 13, 2001, [last accessed Apr. 30, 2021]. 2 pages.
[No Author Listed], Borosil Vision Mezzo Mug Set of 2. Zola. 3 pages. https://www.zola.com/shop/product/borosil_vision_mezzao_mug_setof2_3.25. [date retrieved May 4, 2021].
[No Author Listed], Cable Systems. Samtec. Aug. 2010. 148 pages.
[No Author Listed], Coating Electrical Contacts. Brush Wellman Engineered Materials. Jan. 2002;4(1). 2 pages.
[No Author Listed], Common Management Interface Specification. Rev 4.0. MSA Group. May 8, 2019. 265 pages.
[No Author Listed], Electronics Connector Overview. FCI. Sep. 23, 2009. 78 pages.
[No Author Listed], EMI Shielding Compounds Instead of Metal. RTP Company. Last Accessed Apr. 3, 20210. 2 pages.
[No Author Listed], EMI Shielding Solutions and EMC Testing Services from Laird Technologies. Laird Technologies. Last acessed Apr. 30, 2021. 1 page.
[No Author Listed], EMI Shielding, Dramatic Cost Reductions for Electronic Device Protection. RTP. Jan. 2000. 10 pages.
[No Author Listed], Excerpt from The Concise Oxford Dictionary, Tenth Edition. 1999. 3 pages.
[No Author Listed], Excerpt from The Merriam-Webster Dictionary, Between. 2005. 4 pages.
[No Author Listed], Excerpt from Webster's Third New International Dictionary, Contact. 1986. 3 pages.
[No Author Listed], FCI—High Speed Interconnect Solutions, Backpanel Connectors. FCI. [last accessed Apr. 30, 2021). 2 pages.
[No Author Listed], General Product Specification for GbX Backplane and Daughtercard Interconnect System. Revision "B". Teradyne. Aug. 23, 2005. 12 pages.
[No Author Listed], Hozox Emi Absorption Sheet and Tape. Molex. Laird Technologies. 2013. 2 pages.
[No Author Listed], INF-8074i Specification for SFP (Small Formfactor Pluggable) Transceiver. SFF Committee. Revision 1.0. May 12, 2001. 39 pages.
[No Author Listed], INF-8438i Specification for QSFP (Quad Small Formfactor Pluggable) Transceiver. Rev 1.0 Nov. 2006. SFF Committee. 76 pages.
[No Author Listed], Interconnect Signal Integrity Handbook. Samtec. Aug. 2007. 21 pages.
[No Author Listed], Metallized Conductive Products: Fabric-Over-Foam, Conductive Foam, Fabric, Tape. Laird Technologies. 2003. 32 pages.
[No Author Listed], Metral® 2000 Series. FCI. 2001. 2 pages.
[No Author Listed], Metral® 2mm High-Speed Connectors 1000, 2000, 3000 Series. FCI. 2000. 119 pages.
[No Author Listed], Metral® 3000 Series. FCI. 2001. 2 pages.
[No Author Listed], Metral® 4000 Series. FCI. 2002. 2 pages.
[No Author Listed], Metral® 4000 Series: High-Speed Backplane Connectors. FCI, Rev. 3. Nov. 30, 2001. 21 pages.
[No Author Listed], Molex Connectors as InfiniBand Solutions. Design World. Nov. 19, 2008. 7 pages. https://www.designworldonline.com/molex-connectors-as-infiniband-solutions/. [last accessed May 3, 2021].
[No Author Listed], OSFP MSA Specification for OSFP Octal Small Form Factor Pluggable Module. Revision 1.11. OSFP MSA. Jun. 26, 2017. 53 pages.
[No Author Listed], OSFP MSA Specification for OSFP Octal Small Form Factor Pluggable Module. Revision 1.12. OSFP MSA. Aug. 1, 2017. 53 pages.
[No Author Listed], OSFP MSA Specification for OSFP Octal Small Form Factor Pluggable Module. Revision 2.0 OSFP MSA. Jan. 14, 2019. 80 pages.
[No Author Listed], OSFP MSA Specification for OSFP Octal Small Form Factor Pluggable Module. Revision 3.0 OSFP MSA. Mar. 14, 2020. 99 pages.
[No Author Listed], Photograph of Molex Connector. Oct. 2021. 1 page.
[No Author Listed], Photograph of TE Connector. Oct. 2021. 1 page.
[No Author Listed], Pluggable Form Products. Tyco Electronics. Mar. 5, 2006. 1 page.
[No Author Listed], Pluggable Input/Output Solutions. Tyco Electronics Catalog 1773408-1. Revised Feb. 2009. 40 pages.
[No Author Listed], QSFP Market Evolves, First Products Emerge. Lightwave. Jan. 22, 2008. pp. 1-8. https://www.lightwaveonline.com/home/article/16662662.
[No Author Listed], QSFP-DD Hardware Specification for QSFP Double Density 8X Pluggable Transceiver, Rev 3.0. QSFP-DD MSA. Sep. 19, 2017. 69 pages.
[No Author Listed], QSFP-DD Hardware Specification for QSFP Double Density 8X Pluggable Transceiver, Rev 4.0. QSFP-DD MSA. Sep. 18, 2018. 68 pages.
[No Author Listed], QSFP-DD MSA QSFP-DD Hardware Specification for QSFP Double Density 8X Pluggable Transceiever. Revision 5.0. QSFP-DD-MSA. Jul. 9, 2019. 82 pages.
[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.
[No Author Listed], QSFP-DD MSA QSFP-DD Specification for QSFP Double Density 8X Pluggable Transceiver. Revision 1.0. QSFP-DD-MSA. Sep. 15, 2016. 69 pages.
[No Author Listed], QSFP-DD Specification for QSFP Double Density 8X Pluggable Transceiver Specification, Rev. 2.0. QSFP-DD MSA. Mar. 13, 2017. 106 pages.
[No Author Listed], RTP Company Introduces "Smart" Plastics for Bluetooth Standard. Press Release. RTP. Jun. 4, 2001. 2 pages.
[No Author Listed], RTP Company Specialty Compounds. RTP. Mar. 2002. 2 pages.
[No Author Listed], RTP Company—EMI/RFI Shielding Compounds (Conductive) Data Sheets. RTP Company. Last accessed Apr. 30, 2021. 4 pages.
[No Author Listed], Samtec Board Interface Guide. Oct. 2002. 253 pages.
[No Author Listed], SFF Committee SFF-8079 Specification for SFP Rate and Application Selection. Revision 1.7. SFF Committee. Feb. 2, 2005. 21 pages.
[No Author Listed], SFF Committee SFF-8089 Specification for SFP (Small Formfactor Pluggable) Rate and Application Codes. Revision 1.3. SFF Committee. Feb. 3, 2005. 18 pages.
[No Author Listed], SFF Committee SFF-8436 Specification for QSFP+ 4X 10 GB/s Pluggable Transceiver. Revision 4.9. SFF Committee. Aug. 31, 2018. 88 pages.

(56) References Cited

OTHER PUBLICATIONS

[No Author Listed], SFF Committee SFF-8665 Specification for QSFP+ 28 GB/s 4X Pluggable Transceiver Solution (QSFP28). Revision 1.9. SFF Committee. Jun. 29, 2015. 14 pages.
[No Author Listed], SFF-8075 Specification for PCI Card Version of SFP Cage. Rev 1.0. SFF Committee. Jul. 3, 2001. 11 pages.
[No Author Listed], SFF-8431 Specifications for Enhanced Small Form Factor Pluggable Module SFP+. Revision 4.1. SFF Committee. Jul. 6, 2009. 132 pages.
[No Author Listed], SFF-8432 Specification for SFP+ Module and Cage. Rev 5.1. SFF Committee. Aug. 8, 2012. 18 pages.
[No Author Listed], SFF-8433 Specification for SFP+ Ganged Cage Footprints and Bezel Openings. Rev 0.7. SFF Committee. Jun. 5, 2009. 15 pages.
[No Author Listed], SFF-8477 Specification for Tunable XFP for ITU Frequency Grid Applications. Rev 1.4. SFF Committee. Dec. 4, 2009. 13 pages.
[No Author Listed], SFF-8672 Specification for QSFP+ 4x 28 GB/s Connector (Style B). Revision 1.2. SNIA. Jun. 8, 2018. 21 pages.
[No Author Listed], SFF-8679 Specification for QSFP+ 4X Base Electrical Specification. Rev 1.7. SFF Committee. Aug. 12, 2014. 31 pages.
[No Author Listed], SFF-8682 Specification for QSFP+ 4X Connector. Rev 1.1. SNIA SFF TWG Technology Affiliate. Jun. 8, 2018. 19 pages.
[No Author Listed], Shielding Theory and Design. Laird Technologies. Last accessed Apr. 30, 2021. 1 page.
[No Author Listed], Shielding Theory and Design. Laird Technologies. Last accessed Apr. 30, 2021. 2 pages. URL:web.archive.org/web/20030226182710/http://www.lairdtech.com/catalog/staticdata/shieldingtheorydesign/std_3.htm.
[No Author Listed], Shielding Theory and Design. Laird Technologies. Last accessed Apr. 30, 2021. 2 pages. URL:web.archive.org/web/20021223144443/http://www.lairdtech.com/catalog/staticdata/shieldingtheorydesign/std_2.htm.
[No Author Listed], Signal Integrity—Multi-Gigabit Transmission Over Backplane Systems. International Engineering Consortium. 2003;1-8.
[No Author Listed], Signal Integrity Considerations for 10Gbps Transmission over Backplane Systems. DesignCon2001. Teradyne Connections Systems, Inc. 2001. 47 pages.
[No Author Listed], Specification for OSFP Octal Small Form Factor Pluggable Module. Rev 1.0. OSFP MSA. Mar. 17, 2017. 53 pages.
[No Author Listed], TB-2092 GbX Backplane Signal and Power Connector Press-Fit Installation Process. Teradyne. Aug. 8, 2002;1-9.
[No Author Listed], Teradyne Beefs Up High-Speed GbX Connector Platform. EE Times. Sep. 20, 2005. 3 pages.
[No Author Listed], Teradyne Connection Systems Introduces the GbX L-Series Connector. Press Release. Teradyne. Mar. 22, 2004. 5 pages.
[No Author Listed], Teradyne Schematic, Daughtercard Connector Assembly 5 Pair GbX, Drawing No. C-163-5101-500. Nov. 6, 2002. 1 page.
[No Author Listed], Tin as a Coating Material. Brush Wellman Engineered Materials. Jan. 2002;4(2). 2 pages.
[No Author Listed], Two and Four Pair HM-Zd Connectors. Tyco Electronics. Oct. 14, 2003;1-8.
[No Author Listed], Tyco Electronics Schematic, Header Assembly, Right Angle, 4 Pair HMZd, Drawing No. C-1469048. Jan. 10, 2002. 1 page.
[No Author Listed], Tyco Electronics Schematic, Receptacle Assembly, 2 Pair 25mm HMZd, Drawing No. C-1469028. Apr. 24, 2002. 1 page.
[No Author Listed], Tyco Electronics Schematic, Receptacle Assembly, 3 Pair 25mm HMZd, Drawing No. C1469081. May 13, 2002. 1 page.
[No Author Listed], Tyco Electronics Schematic, Receptacle Assembly, 4 Pair HMZd, Drawing No. C1469001. Apr. 23, 2002. 1 page.
[No Author Listed], Tyco Electronics Z-Dok+ Connector. May 23, 2003. pp. 1-15. http://zdok.tycoelectronics.com.
[No Author Listed], Tyco Electronics, SFP System. Small Form-Factor Pluggable (SFP) System. Feb. 2001. 1 page.
[No Author Listed], Typical conductive additives—Conductive Compounds. RTP Company. https://www.rtpcompany.com/products/conductive/additives.htm. Last accessed Apr. 30, 2021. 2 pages.
[No Author Listed], Z-Pack HM-Zd Connector, High Speed Backplane Connectors. Tyco Electronics. Catalog 1773095. 2009;5-44.
[No Author Listed], Z-Pack HM-Zd: Connector Noise Analysis for XAUI Applications. Tyco Electronics. Jul. 9, 2001. 19 pages.
Atkinson et al., High Frequency Electrical Connector, U.S. Appl. No. 15/645,931, filed Jul. 10, 2017.
Chung, Electrical applications of carbon materials. J. of Materials Science. 2004;39:2645-61.
Dahman, Recent Innovations of Inherently Conducting Polymers for Optimal (106-109 Ohm/Sq) ESD Protection Materials. RTD Company. 2001. 8 pages.
Do et al., A Novel Concept Utilizing Conductive Polymers on Power Connectors During Hot Swapping in Live Modular Electronic Systems. IEEE Xplore 2005; downloaded Feb. 18, 2021;340-345.
Eckardt, Co-Injection Charting New Territory and Opening New Markets. Battenfeld GmbH. Journal of Cellular Plastics. 1987;23:555-92.
Elco, Metral® High Bandwidth—A Differential Pair Connector for Applications up to 6 GHz. FCI. Apr. 26, 1999;1-5.
Feller et al., Conductive polymer composites: comparative study of poly(ester)-short carbon fibres and poly(epoxy)-short carbon fibres mechanical and electrical properties. Materials Letters. Feb. 21, 2002;57:64-71.
Getz et al., Understanding and Eliminating EMI in Microcontroller Applications. National Semiconductor Corporation. Aug. 1996. 30 pages.
Grimes et al., A Brief Discussion of EMI Shielding Materials. IEEE. 1993:217-26.
Housden et al., Moulded Interconnect Devices. Prime Faraday Technology Watch. Feb. 2002. 34 pages.
McAlexander, CV of Joseph C. McAlexander III . Exhibit 1009. 2021. 31 pages.
McAlexander, Declaration of Joseph C. McAlexander III in Support of Petition for Inter Partes Review of U.S. Pat. No. 10,381,767. Exhibit 1002. Nov. 4, 2021. 85 pages.
Nadolny et al., Optimizing Connector Selection for Gigabit Signal Speeds. Sep. 2000. 5 pages.
Neelakanta, Handbook of Electromagnetic Materials: Monolithic and Composite Versions and Their Applications. CRC. 1995. 246 pages.
Okinaka, Significance of Inclusions in Electroplated Gold Films for Electronics Applications. Gold Bulletin. Aug. 2000;33(4):117-127.
Ott, Noise Reduction Techniques In Electronic Systems. Wiley. Second Edition. 1988. 124 pages.
Patel et al., Designing 3.125 Gbps Backplane System. Teradyne. 2002. 58 pages.
Preusse, Insert Molding vs. Post Molding Assembly Operations. Society of Manufacturing Engineers. 1998. 8 pages.
Ross, Focus on Interconnect: Backplanes Get Reference Designs. EE Times. Oct. 27, 2003 [last accessed Apr. 30, 2021]. 4 pages.
Ross, GbX Backplane Demonstrator Helps System Designers Test High-Speed Backplanes. EE Times. Jan. 27, 2004 [last accessed May 5, 2021]. 3 pages.
Silva et al., Conducting Materials Based on Epoxy/Graphene Nanoplatelet Composites With Microwave Absorbing Properties: Effect of the Processing Conditions and Ionic Liquid. Frontiers in Materials. Jul. 2019;6(156):1-9. doi: 10.3389/fmats.2019.00156.
Tracy, Rev. 3.0 Specification IP (Intellectual Property). Mar. 20, 2020. 8 pages.
Violette et al., Electromagnetic Compatibility Handbook. Van Nostrand Reinhold Company Inc. 1987. 229 pages.
Wagner et al., Recommended Engineering Practice to Enhance the EMI/EMP Immunity of Electric Power Systems. Electric Research and Management, Inc. Dec. 1992. 209 pages.

(56) References Cited

OTHER PUBLICATIONS

Weishalla, Smart Plastic for Bluetooth. RTP Imagineering Plastics. Apr. 2001. 7 pages.
White, A Handbook on Electromagnetic Shielding Materials and Performance. Don Whie Consultants. 1998. Second Edition. 77 pages.
White, EMI Control Methodology and Procedures. Don White Consultants, Inc. Third Edition 1982. 22 pages.
Williams et al., Measurement of Transmission and Reflection of Conductive Lossy Polymers at Millimeter-Wave Frequencies. IEEE Transactions on Electromagnetic Compatibility. Aug. 1990;32(3):236-240.
Cohen, High-Frequency Electrical Connector, U.S. Appl. No. 18/075,313, filed Dec. 5, 2022.
Kirk et al., Connector Configurable for High Performance, U.S. Appl. No. 18/085,093, filed Dec. 20, 2022.
Johnescu et al., High Speed Connector, U.S. Appl. No. 17/902,342, filed Sep. 2, 2022.
Chinese Office Action dated Oct. 27, 2023 in connection with Chinese Application No. 202010102518.1.
Taiwanese Office Action dated Aug. 22, 2023 in connection with Taiwanese Application No. 109105340.
Cartier et al., High Speed, High Density Electrical Connector With Shielded Signal Paths, U.S. Appl. No. 18/335,472, filed Jun. 15, 2023.
Johnescu et al., High Speed Connector, U.S. Appl. No. 18/465,351, filed Sep. 12, 2023.
Milbrand et al., High Performance Cable Connector, U.S. Appl. No. 18/449,520, filed Aug. 14, 2023.

* cited by examiner

HIGH SPEED CONNECTOR

CROSS-REFERENCE TO RELATED APPLICATIONS

This application claims the benefit under 35 U.S.C. § 119(e) of U.S. Provisional Patent Application Ser. No. 62/807,653, filed on Feb. 19, 2019, entitled "HIGH SPEED CONNECTOR," which is hereby incorporated herein by reference in its entirety.

TECHNICAL FIELD

This patent application relates generally to interconnection systems, such as those including electrical connectors, used to interconnect electronic assemblies.

BACKGROUND

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a backplane. Other printed circuit boards, called "daughterboards" or "daughtercards," may be connected through the backplane.

A known backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors." Also, boards of the same size or similar sizes may sometimes be aligned in parallel. Connectors used in these applications are often called "stacking connectors" or "mezzanine connectors."

Connectors may also be used in other configurations for interconnecting printed circuit boards and for interconnecting other types of devices, such as cables, to printed circuit boards. Some systems use a midplane configuration. Similar to a backplane, a midplane has connectors mounted on one surface that are interconnected by conductive traces within the midplane. The midplane additionally has connectors mounted on a second side so that daughtercards are inserted into both sides of the midplane.

The daughtercards inserted from opposite sides of the midplane often have orthogonal orientations. This orientation positions one edge of each printed circuit board adjacent the edge of every board inserted into the opposite side of the midplane. The traces within the midplane connecting the boards on one side of the midplane to boards on the other side of the midplane can be short, leading to desirable signal integrity properties.

A variation on the midplane configuration is called "direct attach." In this configuration, daughtercards are inserted from opposite sides of a rack enclosing printed circuit boards of a system. These boards likewise are oriented orthogonally so that the edge of a board inserted from one side of the rack is adjacent to the edges of the boards inserted from the opposite side of the system. These daughtercards also have connectors. However, rather than plugging into connectors on a midplane, the connectors on each daughtercard plug directly into connectors on printed circuit boards inserted from the opposite side of the system. Connectors for this configuration are sometimes called direct attach orthogonal connectors. Examples of direct attach orthogonal connectors are shown in U.S. Pat. Nos. 7,354,274, 7,331,830, 8,678,860, 8,057,267 and 8,251,745.

Regardless of the exact application, electrical connector designs have been adapted to mirror trends in the electronics industry. Electronic systems generally have gotten smaller, faster, and functionally more complex. Because of these changes, the number of circuits in a given area of an electronic system, along with the frequencies at which the circuits operate, have increased significantly in recent years. Current systems pass more data between printed circuit boards and require electrical connectors that are electrically capable of handling more data at higher speeds than connectors of even a few years ago.

In a high density, high speed connector, electrical conductors may be so close to each other that there may be electrical interference between adjacent signal conductors. To reduce interference, and to otherwise provide desirable electrical properties, shield members are often placed between or around adjacent signal conductors. The shields may prevent signals carried on one conductor from creating "crosstalk" on another conductor. The shield may also impact the impedance of each conductor, which may further contribute to desirable electrical properties.

Examples of shielding can be found in U.S. Pat. Nos. 4,632,476 and 4,806,107, which show connector designs in which shields are used between columns of signal contacts. These patents describe connectors in which the shields run parallel to the signal contacts through both the daughterboard connector and the backplane connector. Cantilevered beams are used to make electrical contact between the shield and the backplane connectors. U.S. Pat. Nos. 5,433,617, 5,429,521, 5,429,520, and 5,433,618 show a similar arrangement, although the electrical connection between the backplane and shield is made with a spring type contact. Shields with torsional beam contacts are used in the connectors described in U.S. Pat. No. 5,980,321. Further shields are shown in U.S. Pat. Nos. 9,004,942, 9,705,255.

Other techniques may be used to control the performance of a connector. For instance, transmitting signals differentially may also reduce crosstalk. Differential signals are carried on a pair of conducting paths, called a "differential pair." The voltage difference between the conductive paths represents the signal. In general, a differential pair is designed with preferential coupling between the conducting paths of the pair. For example, the two conducting paths of a differential pair may be arranged to run closer to each other than to adjacent signal paths in the connector. No shielding is desired between the conducting paths of the pair, but shielding may be used between differential pairs. Electrical connectors can be designed for differential signals as well as for single-ended signals. Examples of differential electrical connectors are shown in U.S. Pat. Nos. 6,293,827, 6,503,103, 6,776,659, 7,163,421, and 7,794,278.

SUMMARY

Embodiments of a high speed, high density interconnection system are described. Very high speed performance may be achieved in accordance with some embodiments by a connector having lossy material configured to be adjacent a ground conductor of a mating connector when the connector is mated with the mating connector.

Some embodiments relate to an electrical connector. The electrical connector may comprise a plurality of conductive elements each having a mating contact portion and a housing assembly for the plurality of conductive elements. The housing assembly may comprise lossy material configured to be adjacent a ground conductor of a mating connector when the connector is mated with the mating connector such that resonances are damped.

In some embodiments, the lossy material is configured to partially encircle the ground conductor of the mating connector.

In some embodiments, the plurality of conductive elements comprise a pair of conductive elements. The housing assembly comprises a conductive shield forming at least a portion of an enclosure for the pair of conductive elements. The lossy material is adjacent at least one side of the enclosure.

In some embodiments, the lossy material is adjacent at least one corner of the enclosure.

In some embodiments, the conductive shield is electrically coupled to the ground conductor of the mating connector when the connector is mated with the mating connector.

In some embodiments, the housing assembly comprises insulative material separating the plurality of conductive elements from the lossy material.

Some embodiments relate to an electrical connector. The electrical connector may comprise a plurality of conductive elements each having a mating contact portion, the mating contact portions of the plurality of conductive elements disposed in a column, a ground cross shield extending perpendicular to the column direction, and lossy material adjacent the ground cross shield.

In some embodiments, the ground cross shield comprises a compliant contact portion configured to mate with a ground conductor of a mating connector.

In some embodiments, the electrical connector comprises a housing assembly. The housing assembly comprises a ground plate shield extending parallel to the column direction, and a lossy member attached to the ground plate shield, the lossy member comprising the lossy material adjacent the ground cross shield.

In some embodiments, the ground plate shield has a first surface facing the plurality of conductive elements and a second surface facing opposite to the first surface. The lossy member comprises a first portion attached to the first surface of the ground plate shield, and a second portion attached to the second surface of the ground plate shield, the second portion comprising the lossy material adjacent the ground cross shield.

In some embodiments, the second portion of the lossy member comprises a plurality of ribs configured to form channels that hold the plurality of conductive elements.

In some embodiments, the lossy material adjacent the ground cross shield extends from the plurality of ribs.

In some embodiments, the housing assembly comprises an insulative member attached to the ground plate shield. The insulative member comprises a first portion attached to the first surface of the ground plate shield, the first portion comprising a plurality of separators configured to form channels that hold the mating contact portions of the plurality of conductive elements, and a second portion attached to the second surface of the conductive ground shield.

In some embodiments, the ground cross shield is between the lossy material and one of the plurality of separators of the insulative member.

In some embodiments, the housing assembly is a left housing assembly on a left side of the column of conductive elements. The electrical connector further comprises a right housing assembly on a right side of the column of conductive elements opposite the left side. The column of conductive elements, the left housing assembly, and the right housing assembly constitute a wafer.

In some embodiments, the wafer is a first wafer. The electrical connector comprises a plurality of wafers aligned in a direction substantially perpendicular to the column.

Some embodiments relate to an electrical connector. The electrical connector comprises a plurality of conductive elements each having a mating contact portion and a housing assembly for the plurality of conductive elements. The housing member has lossy material bounding at least one cavity configured to receive a ground conductor of a mating connector when the connector is mated with the mating connector.

In some embodiments, the housing member comprises a plurality of horn-shaped portions formed by the lossy material, each horn-shaped portion bounding one of the at least one cavity.

In some embodiments, the plurality of horn-shaped portions are arranged as pairs. The horn-shaped portions of each pair bound the same cavity configured to receive a respective ground conductor of the mating connector.

Some embodiments relate to a method for manufacturing an electrical connector. The electrical connector may comprise a plurality of conductive elements disposed in a column and a ground plate shield on each side of the column. The plurality of conductive elements may be arranged in pairs. Each ground plate shield may have a first surface facing the plurality of conductive elements and a second surface facing opposite to the first surface. The method may comprise forming first and second shield assemblies by selectively molding lossy material and insulative material to the first and second surfaces of the ground plate shields, placing the first and second shield assemblies on opposite sides of the column of conductive elements, and inserting a ground cross shield between pairs of conductive elements.

These techniques may be used alone or in any suitable combination. The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated connector designs that increase performance of a high density interconnection system, particularly those that carry very high frequency signals that are necessary to support high data rates. The connector designs may provide effective shielding in a mating region for the two connectors. When the two connectors are mated, the shielding may separate mated portions of conductive elements carrying separate signals. In some embodiments, the shielding may substantially encircle the mated portions of conductive elements carrying a signal, which may be pairs of conductive elements for connectors configured for carrying differential signals.

The inventors have recognized and appreciated that, such shielding, while effective at low frequencies may not perform as expected at high frequencies. To enable effective isolation of the signal conductors at high frequencies, the connector may include lossy material selectively positioned within the mating region of at least a first of the connectors. The lossy material may be integrated into the shields so as to damp resonance in conductive elements that form the shielding that at least partially encircles the signal conductors. In some embodiments, the lossy material may be attached to a ground conductor that forms a portion of the shielding. In some embodiments, the lossy material may be adjacent to a ground conductor of a second, mating connector when the first connector is mated with the mating connector. In some embodiments, the lossy material may be shaped as horns that bound a cavity configured to receive a ground conductor from the mating connector.

Figure 1B:
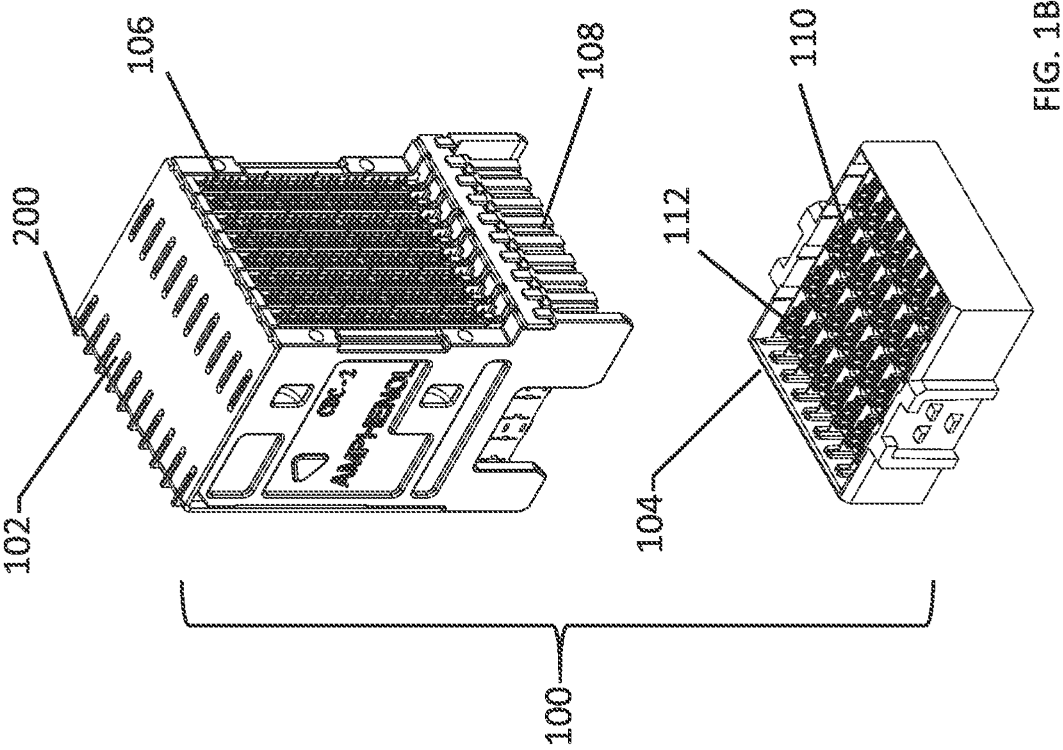
FIGS. 1A and 1B are perspective views of an electrical interconnection system, according to some embodiments, with two connectors shown mated and unmated, respectively.
Figure 1A:
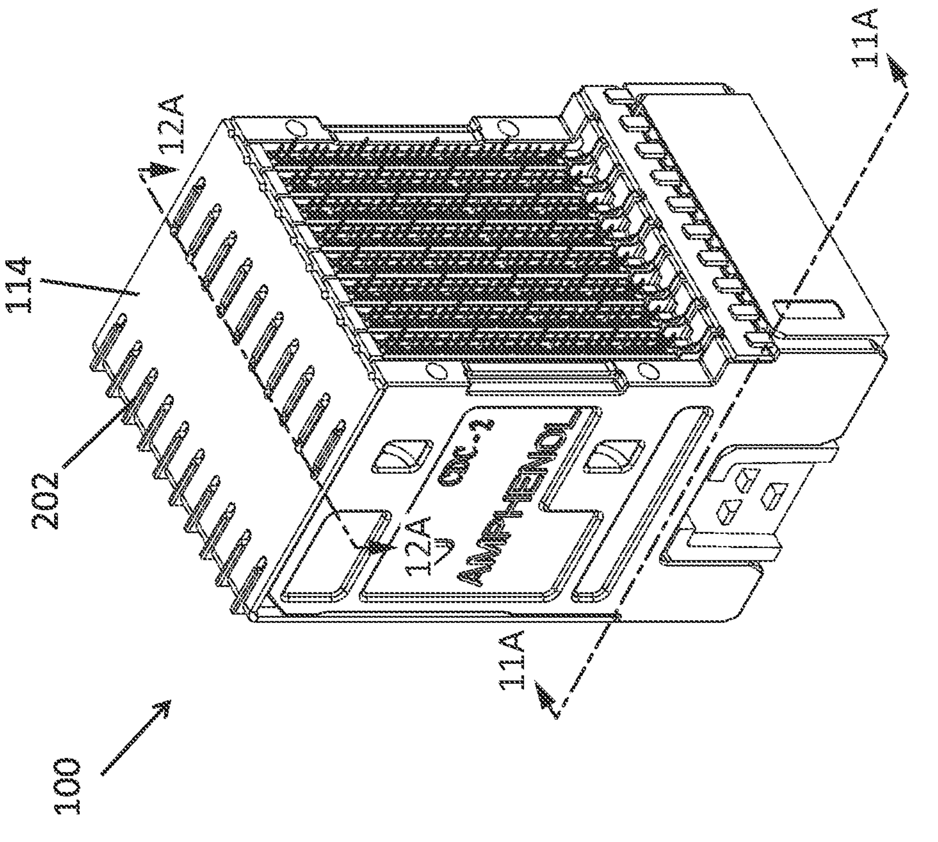

An exemplary embodiment of such connectors is illustrated in FIGS. 1A and 1B. FIGS. 1A and 1B depict an electrical interconnection system 100 of the form that may be used in an electronic system. Electrical interconnection system 100 may include two mating connectors. In the embodiment illustrated, a first of the mating connectors is a right angle connector 102, which may be used, for example, in electrically connecting a daughtercard to a backplane. In the illustrated embodiment, connector 102 is configured to attach to a daughtercard. In the embodiment of FIGS. 1A and 1B, the mating connector is connector 104, which is configured to be attached to a backplane.

The daughtercard connector 102 may include contact tails 106 configured to attach to a daughtercard (not shown). The backplane connector 104 may include contact tails (not shown) configured to attach to a backplane. These contact tails form one end of conductive elements that pass through the interconnection system. When the connectors are mounted to printed circuit boards, these contact tails will make electrical connection to conductive structures within the printed circuit board that carry signals or are connected to a reference potential. In the example illustrated the contact tails are press fit, “eye of the needle,” contacts that are designed to be pressed into vias in a printed circuit board, which in turn may be connected to signal traces or ground planes or other conductive structures within the printed circuit board. However, other forms of contact tails may be used.

Each of the connectors may have a mating interface where that connector can mate—or be separated from—the other connector. The daughtercard connector 102 may include a mating interface 108. The backplane connector 104 may include a mating interface 110. Though not fully visible in the view shown in FIG. 1B, mating contact portions of the conductive elements (e.g., mating contact portions 112 of the conductive elements of the backplane connector 104) are exposed at the mating interface.

Each of these conductive elements includes an intermediate portion that connects a contact tail to a mating contact portion. The intermediate portions may be held within a connector housing, at least a portion of which may be dielectric so as to provide electrical isolation between conductive elements. Additionally, the connector housings may include conductive or lossy portions, which in some embodiments may provide conductive or partially conductive paths between some of the conductive elements or may be positioned to dissipate electromagnetic energy. In some embodiments, the conductive portions may provide shielding. The lossy portions may also provide shielding in some instances and/or may provide desirable electrical properties within the connectors.

In various embodiments, dielectric members may be molded or over-molded on the conductive elements from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

All of the above-described materials are suitable for use as binder material in manufacturing connectors. In accordance some embodiments, one or more fillers may be included in some or all of the binder material. As a non-limiting example, thermoplastic PPS filled to 30% by volume with glass fiber may be used to form the entire connector housing or dielectric portions of the housings.

Alternatively or additionally, portions of the housings may be formed of conductive materials, such as machined metal or pressed metal powder. In some embodiments, portions of the housing may be formed of metal or other conductive material with dielectric members spacing signal conductors from the conductive portions. In the embodiment illustrated, for example, a housing of backplane connector 104 may have regions formed of a conductive material with insulative members separating the intermediate portions of signal conductors from the conductive portions of the housing. The housing of daughtercard connector 102 may also be formed in any suitable way.

Figure 2:
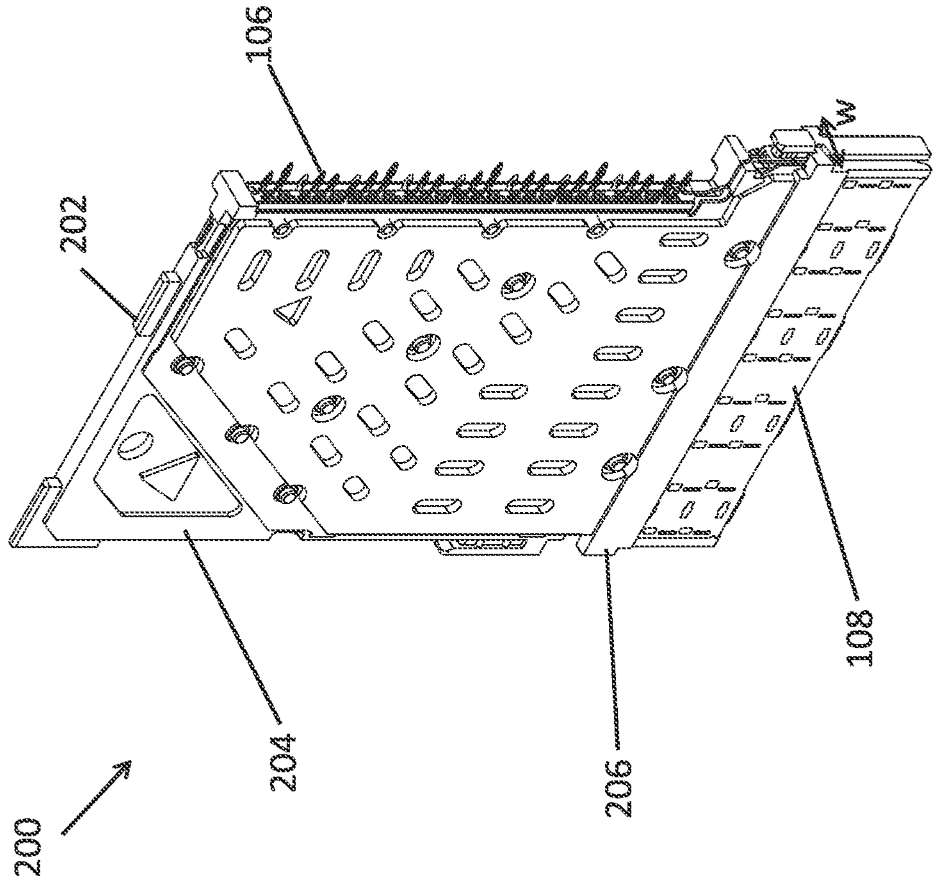
FIG. 2 is a perspective view of a wafer of a daughtercard connector of the electrical interconnection system of FIGS. 1A and 1B, according to some embodiments.

The daughtercard connector 102 may be formed from multiple subassemblies, referred to herein as "wafers." FIG. 2 depicts a perspective view of a wafer 200, which may be used to form the daughtercard connector 102. The wafer 200 may hold a column of conductive elements forming signal conductors. In some embodiments, the signal conductors may be shaped and spaced to form single ended signal conductors. In some embodiments, the signal conductors may be shaped and spaced in pairs to provide pairs of differential signal conductors. The column of signal conductors may include or be bounded by conductive elements serving as ground conductors. It should be appreciated that ground conductors need not be connected to earth ground, but are shaped to carry reference potentials, which may include earth ground, DC voltages or other suitable reference potentials. The "ground" or "reference" conductors may have a shape different than the signal conductors, which are configured to provide suitable signal transmission properties for high frequency signals. In the embodiment illustrated, signal conductors within a column are grouped in pairs positioned for edge-coupling to support a differential signal.

Conductive elements may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

Referring back to FIGS. 1A and 1B, one or more members may hold a plurality of wafers in a desired position. For example, a support member 114 may hold top and rear portions, respectively, of multiple wafers in a side-by-side configuration. The support member 114 may be formed of any suitable material, such as a sheet of metal stamped with tabs, openings or other features that engage corresponding features (e.g., attachment feature 202) on the individual wafers.

Each of the plurality of wafers may hold a column of conductive elements held by a wafer housing 204, as illustrated in FIG. 2. The spacing between adjacent columns of conductors may provide a high density of signal conductors, while still providing desirable signal integrity. The spacing may be controlled by dimensions of the wafer housing 204 including, for example, a width w of an insulative band 206. As a non-limiting example, the conductors may be stamped from 0.4 mm thick copper alloy, and the conductors within each column may be spaced apart by 2.25 mm and the columns of conductors may be spaced apart by 2.4 mm. However, a higher density may be achieved by placing the conductors closer together. In other embodiments, for example, smaller dimensions may be used to provide higher density, such as a thickness between 0.2 and 0.4 mm or spacing of 0.7 to 1.85 mm between columns or between conductors within a column. However, it should be appreciated that more pairs per column, tighter spacing between pairs within the column and/or smaller distances between columns may be used to achieve a higher density connector.

Figure 3:
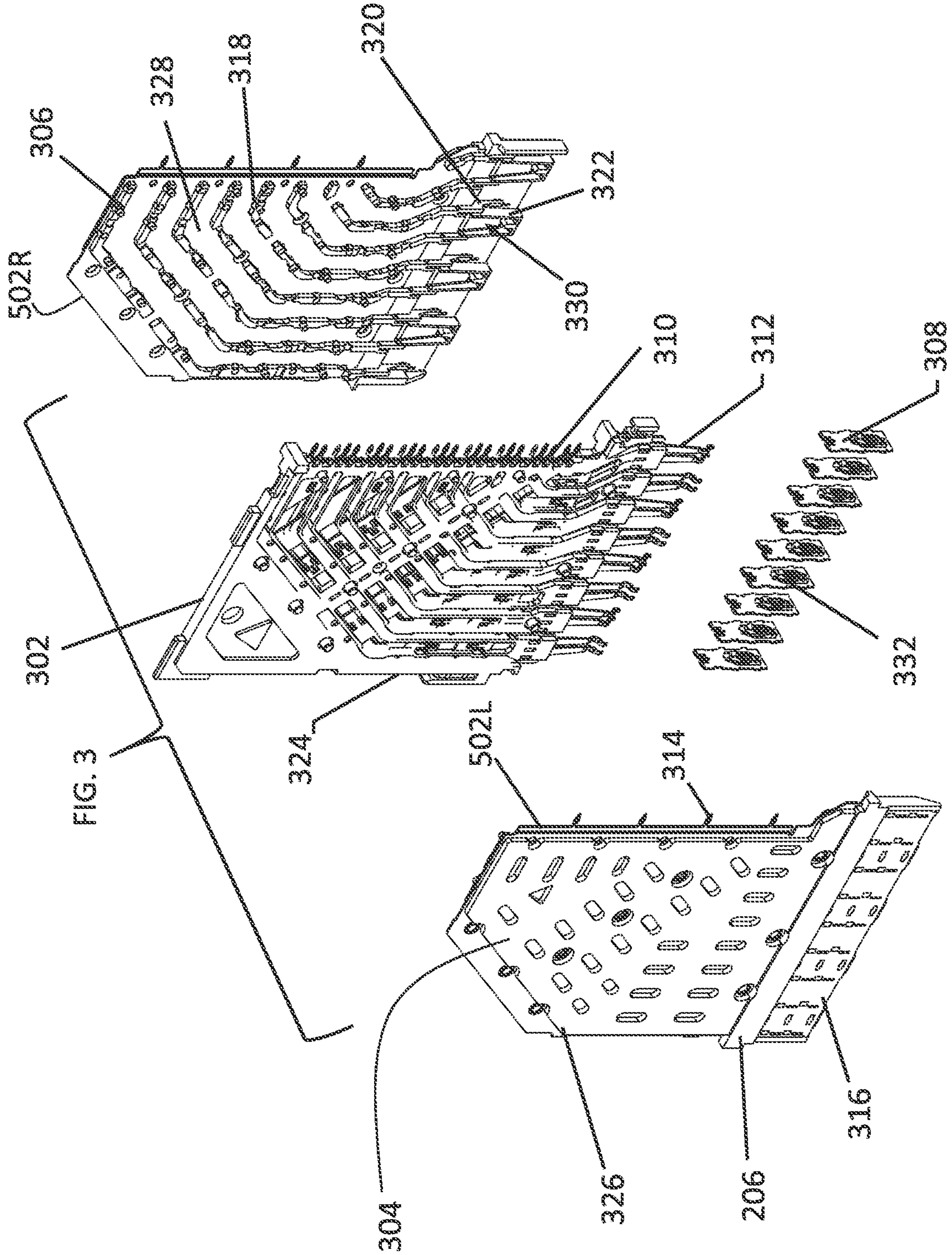
FIG. 3 is an exploded view of the wafer of FIG. 2, according to some embodiments.

FIG. 3 depicts an exploded view of the wafer 200, according to some embodiments. The wafer 200 may include a signal leadframe 302, left and right shield assemblies 304 and 306, and multiple ground cross shields 308. The signal leadframe 302 may include the column of signal conductive elements, each of which may have a contact tail 310, a mating portion 312, and an intermediate portion that extends between the contact tail and mating portion and is held by a signal leadframe housing 324. The signal lead frame 302 may be formed in any suitable way. For example, the signal leadframe housing may be formed around the column of signal conductors by an insert molding process.

As can be seen in FIG. 3, the signal conductors or grouped in pairs along a column. In the illustrated embodiment, the mating portions 312 of the signal conductors include a beam with a convex portion. An outer surface of the convex portion may be plated with gold or other material to form a contact surface. In the illustrated embodiment, the mating portions of the signal conductors that form a pair have contact surfaces facing in the same direction. However, contact surfaces of adjacent pairs face in opposite directions.

In the illustrated embodiment, the signal conductors are positioned within a wafer such that, when daughtercard connector 102 is mated with backplane connector 104, mating portions 312 will press against respective mating contact portions 114 of backplane connector 104. In some embodiments, the mating contact portions 114 of the backplane connector may be blades, pads or other flat surfaces. In the embodiment illustrated in FIG. 1B, however, the mating contact portions 114 may be shaped similarly to mating portions 312. Mating contact portions 114, for example, may have a convex portion near the distal end of a beam. The outer surface of the convex portion may be plated to form a contact surface. In such an embodiment, when the connectors are mated, the convex contact surfaces of each contact portion will press against a surface of the beam of the other mating contact. Those surfaces of the beam may be similarly plated with gold or other noble metal or other coating that resists oxidation so as to reliably form an electrical connection.

As can also be seen in FIG. 3, there is a smaller spacing between signal conductors within a pair than between signal conductors of separate pairs, leaving a space between adjacent pairs of signal conductors. One or more ground conductors may be positioned in this space between adjacent pairs. The ground conductors between adjacent pairs are not visible within signal leadframe housing 324. However, contact tails of the ground conductors are visible extending from an edge of signal leadframe housing 324 in line with contact tails of the signal conductors. This spacing between adjacent signal conductors can also be seen at an edge of signal leadframe housing 324 from which mating portions 312 of the signal conductors extend.

Within a mating region, ground cross shields 308 may be positioned between pairs of differential signal conductors. In the illustrated embodiment, ground cross shields 308 have generally planar surfaces that are perpendicular to the column direction. In this configuration, ground cross shields 308 separate adjacent pairs in the column direction. In the illustrated embodiment, there is one more ground cross shield 308 than there are pairs of signal conductors such that each pair of signal conductors is between, and adjacent to, two ground cross shields 308.

The ground cross shields 308 may connect to conductive structures within wafer 200 that are designed for connection to ground, such as the ground conductors between signal conductors within signal lead frame housing 324. An upper edge of the ground cross shields 308 may be shaped to make a connection with an end of such a ground conductor. Alternatively or additionally, the ground cross shield 308 may be electrically connected to conductive ground plates of the left and right shield assemblies, such as via edges of ground cross shield 308 inserted into slots of the ground plates or other attachment mechanisms.

The ground cross shield may include contact features 332 configured to make contacts with ground conductors of a mating connector. The contact features may be configured to provide desirable contacting force. In some embodiments, the contact features may be formed as one or more beams that are bent of the plane of the body of the ground cross shield. When a mating contact forces these beams towards the body of the ground cross shield, a counter force, sufficient to provide electrical contact will be generated. In the illustrated embodiment, the contact features are formed an assemblage of multiple beams, joined to the body of the cross shield at the top and bottom. The assemblage of beams has a shape resembling a paper clip. Contact surfaces are formed at intersections of beams extending in opposite directions. The beams are bent so that those contact surfaces extend from the plane of the ground cross shields 308.

The ground cross shields 308 may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

Each of the left and right shield assemblies 304 and 306 may include a ground plate shield 502L and 502R, respectively. The ground plate shield may include contact tails 314 configured to mount to a daughtercard and make electrical contacts to ground planes of the daughtercard. The contact tails 314 may form a portion of the contact tails 106 of wafer 200 (FIG. 2). In the illustrated embodiment, the contact tails 314 for each of the ground plate shields are positioned in a line, which is parallel to the line of contact tails 310 of the conductive elements in signal leadframe 302. In some embodiments, the contact tails 314 may be in the same plane as a body of the ground plate shield from which they extend. In such an embodiment, the contact tails 314 will be offset from the line of contact tails 310 in directions perpendicular to the line of contact tails 310. In other embodiments, the contact tails 310 may extend from portions of the ground plate shield that are bent out of the plane of the body of the ground plate shield. In some embodiments, the contact tails 310 may extend from portions of the ground plate shield that are bent towards the signal leadframe 302. In such a configuration, the contact tails 314 may be in the line of contact tails 310.

In the embodiment illustrated in FIG. 3, each of the ground plate shields 502L and 502R has half as many contact tails 314 as there are pairs of signal conductors within signal lead frame 302. The contact tails 314 are spaced by the distance between two adjacent pairs. Further, the contact tails 314 of the ground plate shields 502L and 502R are offset from each other in a direction along the line of contact tails 310 by a spacing equal to the space between contact tails of one pair of signal conductors. Such a configuration enables a contact tail 314 to be positioned adjacent a contact tail 310 of a signal conductor within signal leadframe 302. Further, it enables a contact tail 314 to be positioned between a contact tails 310 of each pair of signal conductors within signal leadframe 302. In embodiments in which there are ground conductors within signal leadframe 302 with contact tails between the contact tails of pairs of signal conductors, there may be multiple ground contact tails between the contact tails of each pair of signal conductors. In the embodiment illustrated, there may be two ground contact tails between contact tails of each pair of signal conductors—one ground contact tail from a ground conductor within signal leadframe 302 and one from a ground plate shield 502L or 502R.

The ground plate shield may also include a mating end 316 configured to mate with a backplane connector (e.g., connector 104), and a plate 504 (visible in FIG. 5) that extends between the contact tails 314 and mating end 316. The ground plate shield may include a first surface 602 (visible in FIG. 6) facing the column of signal conductive elements, and a second surface 508 (visible in FIG. 5) facing opposite to a respective first surface. When a wafer 200 is assembled, the mating contact portions and intermediate portions of each column of signal conductors will be between the ground plate shields 502L and 502R.

Figure 5:
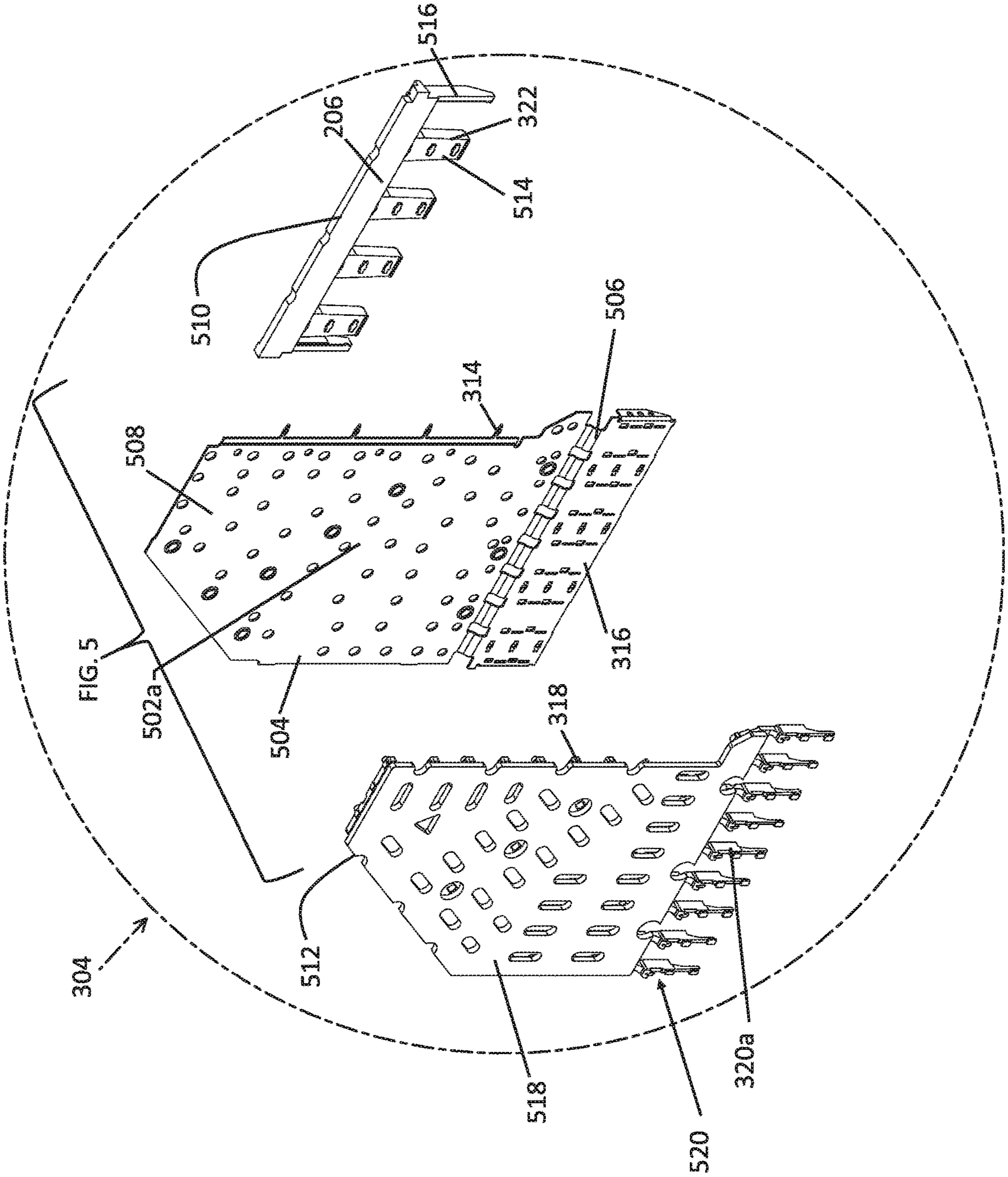
FIG. 5 is an exploded view of a left shield assembly of the wafer of FIG. 2, according to some embodiments.

Each ground plate shield may have a shield housing 326 attached to it. In the embodiment illustrated, the shield housing 326 may be insert molded around or onto the ground plate shield. Shield housing 326 may be insulative and may include features that position the shield assemblies 304 and 306 with respect to signal leadframe 302 in an assembled wafer. The features alternatively or additionally may position and/or electrically insulate conductive elements in the signal lead frame 302 and/or a mating connector. As an example of such a feature, insulative band 206 may be formed on the second surface of a ground plate shield along with separators 322 (FIG. 5).

The shield housing 326 may include a plurality of separators 322 that are adjacent the mating end 316 of the ground plate shield. Each separator of a ground shield assembly may have a space 330 that holds the mating contact portions 312 of a pair of signal conductive elements. Separators 322 for each of the left and right shield assemblies may form spaces 330 for a portion of the pairs of differential signal conductors. In the illustrated embodiment, each of the left and right shield housings has separators 322 for one half of the pairs of mating portions in signal lead frame 302. The spaces 330 for each of the left and right shield assembly 304 and 306 are open in opposite directions perpendicular to the line of mating portions 312. The spaces 330 on separators on right shield assembly 306 are positioned to receive mating portions 312 with contact surfaces facing to the left in the orientation of FIG. 3. These spaces 330 are open to the left, enabling those mating portions to mate with conductive elements from a mating connector that are inserted into daughtercard connector 102 to the left of the line of mating portions 312. The spaces 330 on separators on left shield assembly 304 are positioned to receive mating portions 312 with contact surfaces facing to the right in the orientation of FIG. 3. These spaces 330 are open to the right, enabling those mating portions to mate with conductive elements from a mating connector that are inserted into daughtercard connector 102 to the right of the line of mating portions 312.

The separators 330 may be insulative and configured to provide electrical insulation between adjacent pairs of differential signal conductors. The separators may further include a wall 514 (FIG. 5) to electrically insulate signal conductors from the ground plate 504. Separators 330 may be formed as part of the same insert molding operation in which insulative band 206 is formed, and may form a unitary member with insulative band 206 that is molded around mating end 316. Plate 504 may include holes (not numbered) into which insulative material may flow during the insert molding operation, securing the separators 330 and other molded features to plate 504.

Lossy material may be positioned within a wafer 200, such as by molding lossy material onto a ground plate shield. In some embodiments, shield housing 326 may be molded from a lossy material, and may include a plurality of ribs 318 formed on the first surface of a ground plate shield. Such a configuration may be formed, for example, by flowing lossy material through holes in the ground plate shield as part of an insert molding operation in which shield housing 326 is formed. The ribs 318 may be adjacent the plate 504 of the ground plate shield. The ribs may form a plurality of channels 328, each of which may be configured to hold a pair of differential signal conductors when the shield assemblies 304 and 306 are combined with a signal leadframe 302. In such a configuration, lossy material, in the form of ribs 318, may separate intermediate portions of adjacent pairs of signal conductors within the signal leadframe 302.

As part of the same or different operation, lossy material may be positioned in the mating region. The shield housing 326, for example, may include lossy portions 320 that extend into the mating regions. The lossy portions 320 may extend from the ribs such as may result from forming the lossy portions 320 and ribs 318 as part of the same operation. The lossy portions 320 may be adjacent the mating end 316 of the ground plate shield.

Each lossy portion 320 may be adjacent a respective separator 322 but outside the space 330 configured to hold the mating contact portions of a pair of differential signal conductors. The lossy portions 320 may be horn-shaped. In the embodiment illustrated, there are the same number of lossy portions 320 in each shield assembly 304 and 306 as there are cross shields 308. The lossy portions 320 from shield assemblies 304 and 306 may be positioned to the left and right, respectively, of the contact surfaces of the cross shields 308.

Lossy portions 320 of the left and right shield housings may be arranged to form pairs. Each of the left and right shield housings may contribute one lossy portion for a pair. The lossy portions 320 from shield assemblies 304 and 306 may bound a cavity configured to receive at least a portion of a ground conductor from a mating connector (e.g., connector 102) that will mate with a ground cross shield 308. Alternatively or additionally, ground cross shields 308 may be within the cavity bounded by lossy portions 320. In some embodiments, a ground cross shield 308 may be configured to be inserted between a lossy portion and adjacent separator 322 when the lossy portions are configured to receive a ground conductor from a mating connector. In some embodiments, the lossy portions 320 may be configured to press against the ground cross shields 308, providing an electrical connection between the ground cross shields 308 and the left and/or right ground plate shields. That connection may be lossy.

At least some portions of the shield housing 326, for example, the ribs 318 and/or lossy portions 320, may be molded from or include a lossy material. Any suitable lossy material may be used for these and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 Siemen/meter to about 10,000 Siemens/meter and preferably about 1 Siemen/meter to about 5,000 Siemens/meter. In some embodiments material with a bulk conductivity of between about 10 Siemens/meter and about 200 Siemens/meter may be used. As a specific example, material with a conductivity of about 50 Siemens/meter may be used. However, it should be appreciated that the conductivity of the material may be selected empirically or through electrical simulation using known simulation tools to determine a suitable conductivity that provides a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Massachusetts, US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy portion may be manufactured by stamping a preform or sheet of lossy material. For example, a lossy portion may be formed by stamping a preform as described above with an appropriate pattern of openings. However, other materials may be used instead of or in addition to such a preform. A sheet of ferromagnetic material, for example, may be used.

However, lossy portions also may be formed in other ways. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

Figure 4:
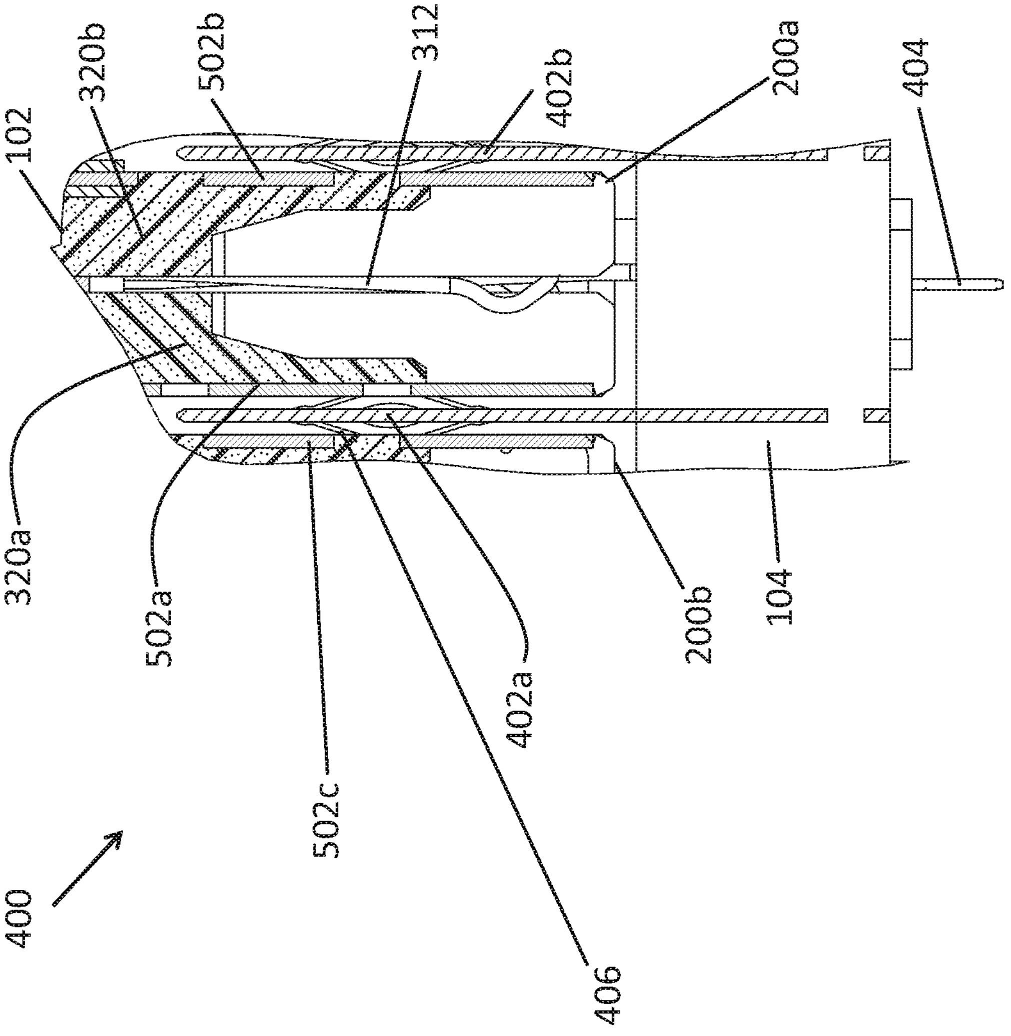
FIG. 4 is a partial cross-sectional view in accordance with line 12A in FIG. 1, according to some embodiments.

FIG. 4 depicts a partial cross-sectional view 400 along line 12A in FIG. 1A, according to some embodiments. The view 400 is perpendicular to the column direction and shows portions of the daughtercard connector 102, which includes a first wafer 200*a* and second wafer 200*b* positioned side-by-side in a row direction. The first wafer 200*a* may include a signal leadframe comprising a signal conductor having a mating portion 312. The first wafer 200*a* may also include left and right shield assemblies on opposite sides of the signal leadframe. The left shield assembly may include a left ground plate shield 502*a*. The right shield assembly may include a right ground plate shield 502*b*. The side-by-side positioning of the wafers positions the left ground plate shield 502*a* adjacent the right ground plate shield 502*c* of wafer 200*b*. The ground plate shields are separated by a slot into which a backplane shield plate may be inserted upon mating. Some or all of the wafers in a connector may be positioned with intervening slots configured to receive shield plates from a mating connector in this manner.

The left shield assembly illustrated in FIG. 4 includes a lossy portion 320*a*. The right shield assembly includes a lossy portion 320*b*. The lossy portions 320*a* and 320*b* are shown configured as a pair and positioned to receive a ground conductor (not shown) between them. That ground conductor may be, for example, a ground shield blade of the backplane connector 104. It should be appreciated that the signal conductor having the mating portion 312 in FIG. 4 is offset in the column direction from the pair of lossy portions 320*a* and 320*b*.

Wafer 200*b* may have a configuration similar to that of wafer 200*a*. The view 400 shows a right ground plate shield 502*c* of a right shield assembly of the second wafer 200*b*.

FIG. 4 shows a mating region of a connector including wafers 200*a* and 200*b*. Those wafers may be configured to form a right angle connector as shown in FIGS. 1A and 1B. However, a mating interface as illustrated in FIG. 4 may be created for connectors of other configurations. FIG. 4 shows a portion of the mating connector, which in the illustrated configuration is a backplane connector. The view 400 also shows portions of the backplane connector 104, which may include conductive elements having contact tails 404 configured to contact a backplane. The conductive element may have mating portions opposite the contact tail 404. The mating portion may be configured to mate with mating portions 312 of a signal conductor of the daughtercard connector 102. In some embodiments, the mating portions of the conductive elements configured to serve as signal conductors in backplane connector 104 may have a mating contact portion shaped like mating portion 312. In other embodiments, the mating portions of the signals conductors in backplane connector 104 may be shaped as blades or have any other suitable form.

The mating portion of the conductive element of the backplane connector 104 may be held by a connector housing, which may be totally or partially insulative. The backplane connector 104 may also include shield plates 402*a* and 402*b*, which may have contact features 406 configured to make contacts with the ground plate shields of the daughtercard connector 102. In the illustrated example, the backplane shield plate 402*a* is inserted between the left ground plate shield 502*a* of the first wafer 200*a* and the right ground plate shield 502*c* of the second wafer 200*c*, and makes contact with the ground plate shields 502*a* and 502*c* through the contact feature 406.

Figure 6:
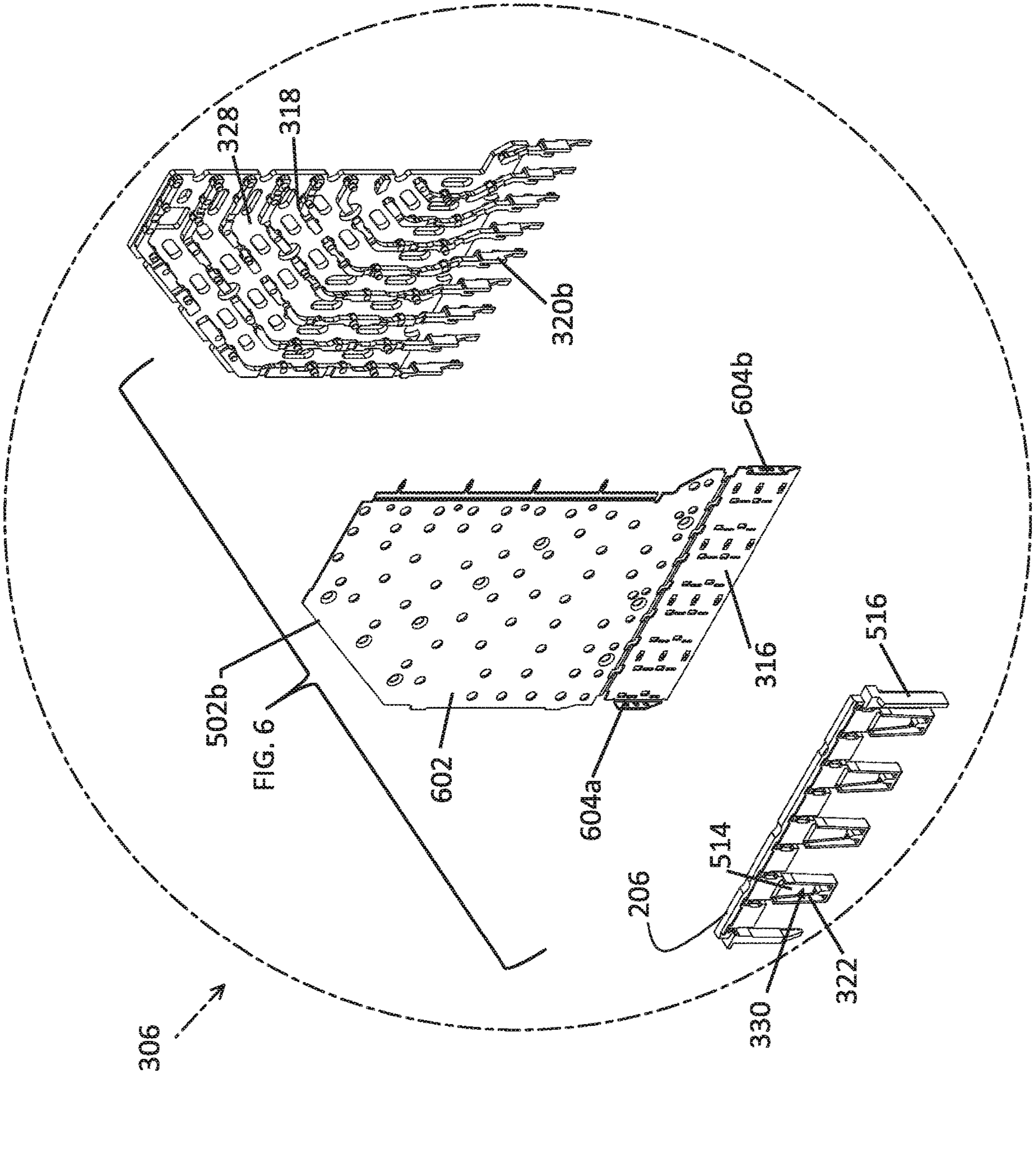
FIG. 6 is an exploded view of a right shield assembly of the wafer of FIG. 2, according to some embodiments.

FIG. 5 and FIG. 6 depict exploded views of left and right shield assemblies 304 and 306, according to some embodiments. FIG. 5 shows the outside of a left shield assembly, and FIG. 6 shows the inside of a right shield assembly. Each shield assembly may include a ground plate shield (e.g., 502*a*, 502*b*), insulative member 510, and lossy member 512. The ground plate shield may include holes configured to be filled with material from the insulative member and/or lossy member, thereby locking the ground plate shield, insulative member and lossy member together.

Each of the ground plate shield 502*a* and 502*b* may include the contact tails 314, mating end 316, and plate 504, which may include a surface 602 facing the column of signal conductors and a surface 508 opposite the surface 602. In some embodiments, there may be a linkage 506 between the plate 504 and mating end 316 such that a distance between the left and right plates 504 of the shields 502*a* and 502*b* may be different from a distance between left and right mating ends 316 of the shields 502*a* and 502*b*. The linkage 506 may offset the mating end in a direction perpendicular to a plane in which the body of plate 504 extends.

The mating end 316 may include bent edges 604*a* and 604*b*, which may be positioned outside the outermost signal conductors. The bend edges may be embedded within pillars 516, which may be formed as part of the insulative housing of the shield assembly. Such a bent edge may provide mechanical support, such as for cross shields 308 at the ends of the column of mating portions 312 or a ground blade from a mating connector intended to make contact with cross shields 308 at the ends of the column. Alternatively or additionally, a bent edge of the left plate shield may be configured to contact with a respective bent edge of the right plate shield.

The insulative member 510 may include the insulative band 206, which may extend in a direction parallel to the column direction. The insulative band 206 may be attached to a surface of a ground plate shield that faces away from the column of signal conductors (e.g., surface 508). The insulative member 510 may include pillars 516 each extending in a direction parallel to the column direction and from an edge of the insulative band. Each pillar may be adjacent and/or attached to a bent edge of a mating end of a ground plate shield (e.g., bent edges 604*a*, 604*b*). The insulative member 510 may also include a plurality of separators 322 extending substantially in parallel with the two pillars 516. Each separator may be configured to hold the mating portions 312 of a pair of differential signal conductors. Each separator may have a The separators 322 and walls 514 may be adjacent and/or attached to a surface of a ground plate shield that faces the column of signal conductors (e.g., surface 602). The walls 514 may insulates mating portions 312 within space 330 from the ground plate shield.

The lossy member 512 may include the ribs 318 extending above a housing portion 518, and the lossy portions 320*a*, 320*b* each substantially extending from a rib 318. The housing portion 518 may be adjacent and/or attached to a surface of a ground plate shield that faces away from the column of signal conductors (e.g., surface 508). The ribs 318 and lossy portions 320*a*, 320*b* may be adjacent and/or attached to a surface a ground plate shield that faces the column of signal conductors (e.g., surface 602). As illustrated in FIG. 5, a lossy portion may be shaped as a horn that extends along a cavity 520, which may be configured to receive a ground conductor.

It should be appreciate that the exploded views of FIGS. 5 and 6 are for illustration purpose. In some embodiments, portions of a shield assembly may be manufactured separately, and then assembled together. In some embodiments, a shield assemblies may be formed by molding insulative and/or lossy material over a ground plate shield. For example, the insulative member 510 may be formed by insertmolding any suitable insulative material to a ground plate shield. The lossy member 512 may be formed by overmolding any suitable lossy material to a ground plate shield. Accordingly, in some embodiments, the elements shown separately in FIGS. 5 and 6 to illustrate the shape of each element, may not be formed separately.

Figure 7:
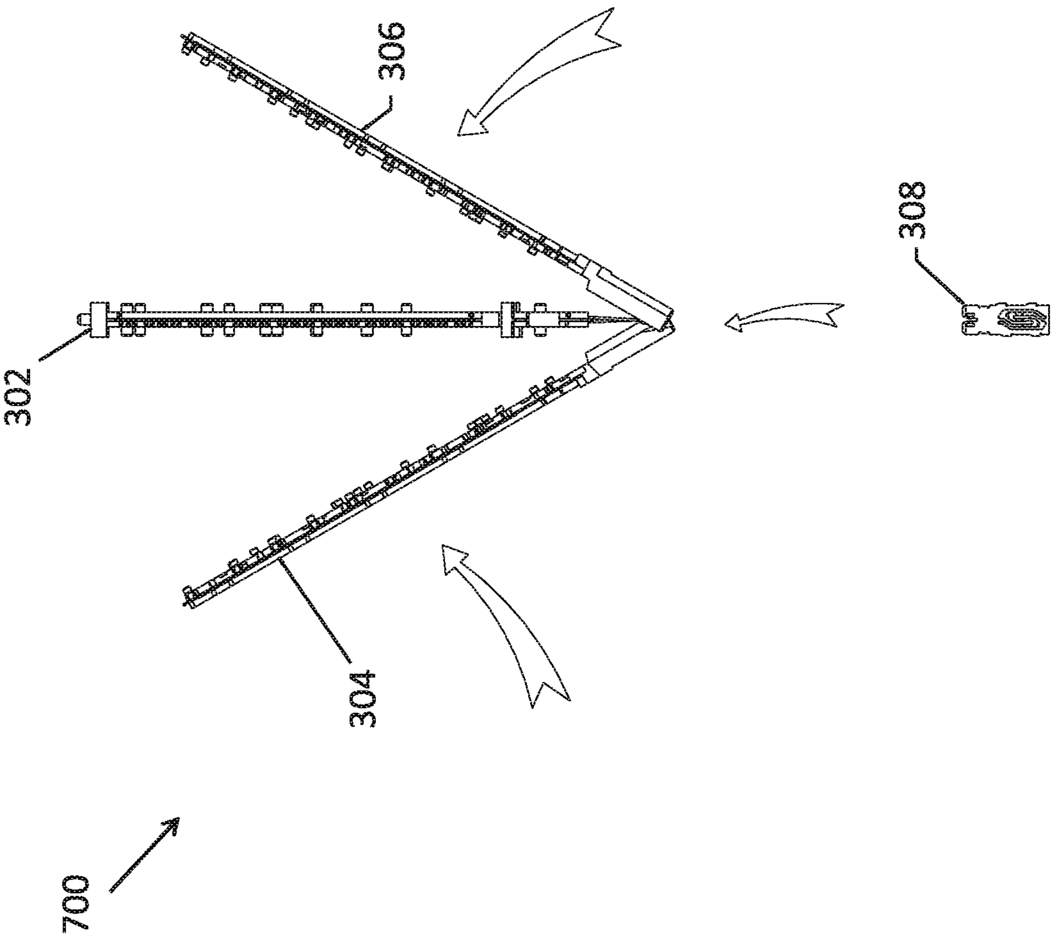
FIG. 7 is an elevation view illustrating an assembly process of the wafer of FIG. 2, according to some embodiments.

FIG. 7 depicts an assembly process 700, which may be used to assemble a wafer (e.g., wafers 200, 200*a*, 200*b*). The assembly process 700 may include first forming the signal leadframe 302 and left and right shield assembly 304 and 306 separately. Then, the left and right shield assemblies 304 and 306 may be placed on opposite sides of the signal leadframe 302. Tips of mating portions 312 may be inserted into the space 330 of separators 322. A floor of the separators 322 may have an opening into 330, leaving a ledge on which the tip may be hooked. The FIG. 7 shows the shield assemblies in this configuration. The left and right shield assembly may then be rotated, in the direction of the arrows of FIG. 7, so as to be pressed against the surfaces if signal leadframe 302. The signal leadframe 302 and left and right shield assemblies 304 and 306 may then be secured together, such as with latching features, adhesive, hot staking or other suitable attachment mechanism.

The assembly process may also include inserting a ground cross shield 308 in a direction parallel to the column direction. The ground cross shield may, as described above, have features that engage a ground conductor within the signal leadframe 302. Alternatively or additionally, the ground cross shield 308 may be electrical connected to the shield plates, providing electrical connection between the left and right shield plates.

The ground cross shields may be inserted between pairs of differential signal conductors. Even in embodiments in which the ground cross shields are not attached to the shield plates, the ground cross shields together with the left and right shield plates may form shield cages (e.g., enclosure 1102 in FIG. 11A) around each pair of differential signal conductors at the mating end.

Figure 8:
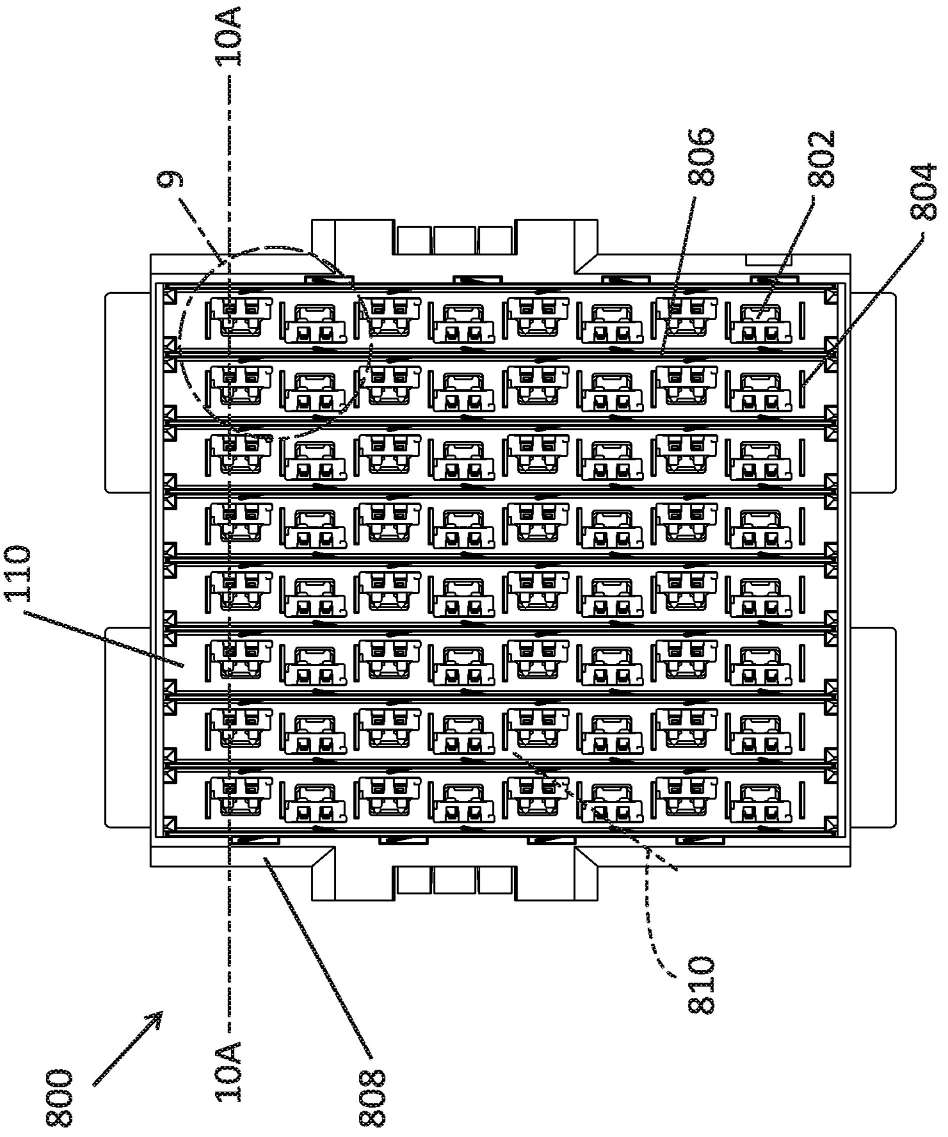
FIG. 8 is a plan view of a backplane connector of the electrical interconnection system of FIGS. 1A and 1B, according to some embodiments.
Figure 9:
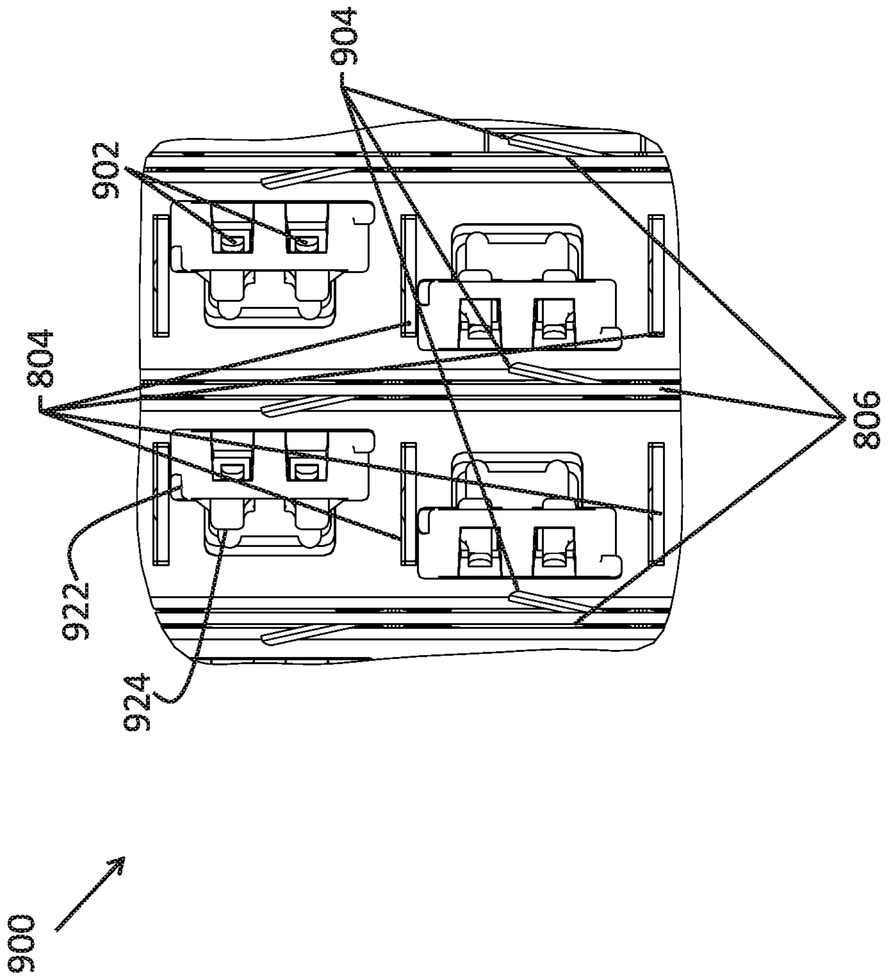
FIG. 9 is an enlarged plan view of circled region 9A in FIG. 8, according to some embodiments.

FIG. 8 is a plan view 800 of the backplane connector 104, showing the mating interface 110, according to some embodiments. FIG. 9 is an enlarged plan view 900 of circled region 9A in FIG. 8, according to some embodiments. The backplane connector 104 may include a plurality of contact sections 802 arranged in columns and rows and held by a housing 808. Each contact section may include an insulative separator 922. Each separator 922 may hold a pair of conductive elements 902 configured with mating surfaces 924 facing out of an opening in the separator.

Distal tips of the conductive elements are visible in openings of the separator 922 in the view of FIG. 9. The opposite ends of the conductive elements may be configured for attachment to a backplane. These mounting ends may be, for example, contact tails 404 illustrated in FIG. 4.

Separators 922, and the conductive elements within them, may be configured to mate with a daughtercard connector (e.g., connector 102). The mating interface 110 may be configured to be complimentary to the mating interface 108, such that backplane connector 104 mates with daughtercard 102. Accordingly, each of the contact sections 802 may be configured to face separator 322 of daughtercard connector 102. A column of contact sections may be arranged such that the conductive elements in adjacent contact sections face in opposite directions. Further, the contact sections may be offset with respect to each other in a direction perpendicular to the column direction. Adjacent conductive elements in adjacent contact sections may be substantially aligned in a line 810 that extends in an acute angle to a shield plate 806. By this design, the conductive elements in adjacent contact sections can be spaced apart by a distance greater than the distance between the adjacent contact sections in the column direction and thus reduce crosstalks between the pairs of signal conductors in adjacent contact sections.

Shield blades 804 may be positioned between adjacent contact sections and at two ends of a column to further reduce the crosstalk. Shield plates 806 may be positioned between adjacent columns. Shield plates 806 may include contact features 904 extending out of planes in which the shield plates extend. Examples of shield plates are illustrated as backplane shield plates 402*a*, 402*b* in FIG. 4. The contact feature 406 is an example of a contact feature 904. Shield blades 804 and shield plates 806 may substantially surround the signal conductors within each of the separators 922.

Figure 10D:
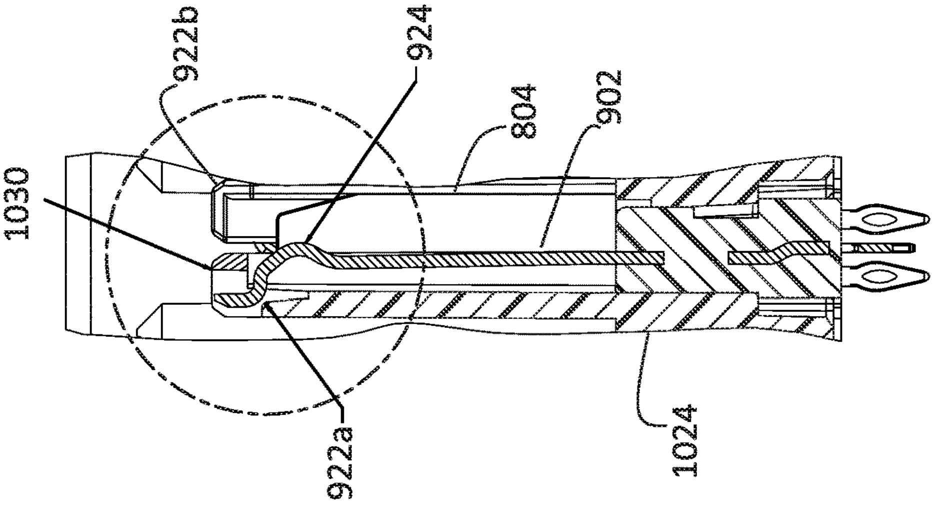
FIG. 10D is an enlarged cross-sectional view of circled region 10D in FIG. 10D, according to some embodiments.
Figure 10C:
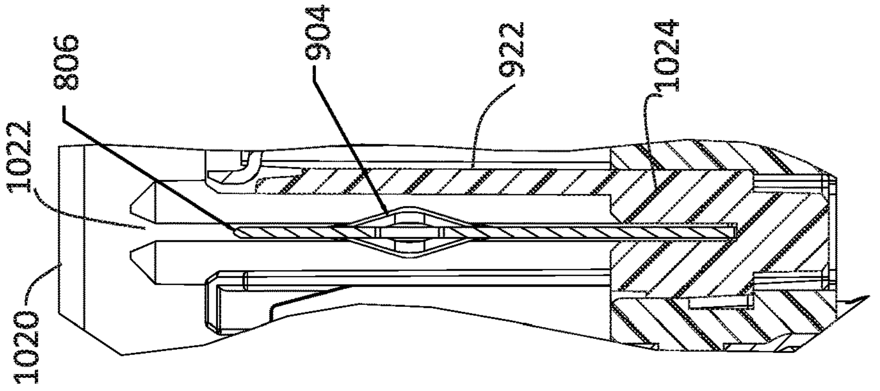
FIG. 10C is an enlarged cross-sectional view of circled region 10C in FIG. 10A, according to some embodiments.
Figure 10A:
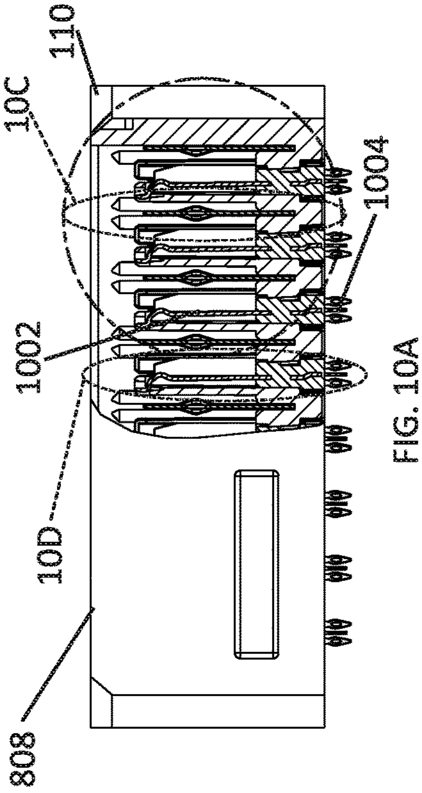
FIG. 10A is a side view of the backplane connector of FIG. 8, partially cut away to reveal a cross-section along line 10A in FIG. 8, according to some embodiments.

FIG. 10A is a side view of the backplane connector 104 of FIG. 8, partially cut away to reveal a cross-section along line 10A in FIG. 8. The backplane connector 104 may include a plurality of conductive elements 1002 held by the housing 808, which is molded of an insulative material in this embodiment. The backplane connector 104 may include a plurality of contact tails 1004 at a mounting end of the conductive elements that is opposite the mating interface 110.

Figure 10B:
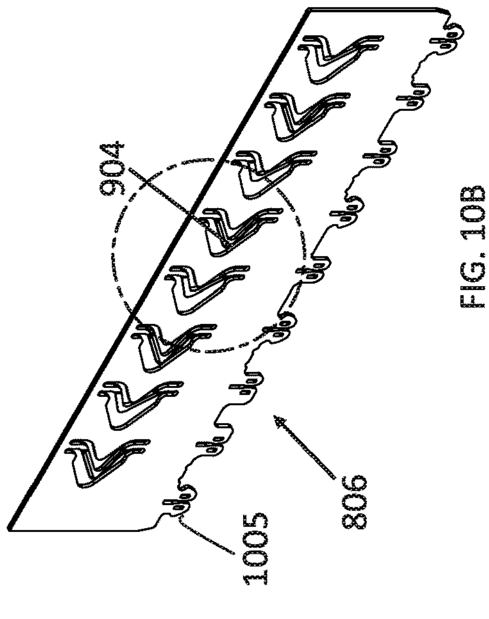
FIG. 10B is a perspective view of a shield plate of the backplane connector of FIG. 10A, according to some embodiments.

FIG. 10B is a perspective view of a shield plate 806, according to some embodiments. In the illustrated embodiment, shield plate 806 include contact features 904 that, like the contract features on ground cross shields 308, are formed by an assemblage of beams stamped from the same sheet of metal used to form the body of shield plate 806. In this example, contact features 904 are each made from two beams, each attached at one end to the shield plate body and at the other end to the other beam such that each contact features 904 is chevron-shaped. The tips of these triangles are bent out of the plane of the shield plate body and generate a counter force when pressed back towards the shield plate body. In this way, contact force may be generated to mate with a conductive structure, such as the mating ends 316 of shield assemblies 502*a* and 502*b*, beside shield plate 806. In the embodiment illustrated in FIG. 10B, shield plate 806 has contact features 904 alternately bent to opposite sides of the plane of the shield plate body. In this way, shield plate 806 may mate to two conductive structures, one on each side of the shield plate body.

Shield plate 806 may contain features configured for connecting the shield plate to ground structures on a printed circuit board to which backplane connector 104 is mounted. In the embodiment of FIG. 10B engagement features 1005 are configured to engage with an edge of a flat metal piece. Engagement features 1005 have two compliant sections, which may be stamped from the same sheet of metal as the shield plate body. The compliant sections are separated by a slot into which an edge of the sheet of metal to engage is inserted. Such engagement features may form a suitable contact and may similarly be used to engage cross shields 308 to conductive elements.

The strips of metal engaged by engagement features 1005 in turn may include contact tails that are attached to a printed circuit board. For example, the engagement features 1005 may engage metal portions extending from shield blades 804, which include contact tails for attachment to a ground structure in a printed circuit board. Alternatively or additionally, engagement features 1005 may engage separate strips of metal inserted into housing 808 and extending perpendicularly to the shielded plates 806. Those separate strips of metal may include press fit or other contact tails.

FIG. 10C is an enlarged cross-sectional view of circled region 10C in FIG. 10A, according to some embodiments. A wall 1020 of housing 808 is visible in the view of FIG. 10C. A channel 1022 is formed in wall 1020. An end of shield plate 806 may be anchored in channel 1022. The opposite end of shield plate 806 may be anchored in a similar channel in an opposing wall of housing 808. Housing 808 may include a floor 1024. A bottom edge of shield plate 806 may be anchored in the floor 1024.

The shield plate 806 may include contact features 904, which can be seen in this view to be bent out of the plane of the body of shield plate 806. The contact features may be long enough that they will flex when pressed back into the plane of the shield plate. The arms may be sufficiently resilient to provide a spring force when pressed back into the plane of the shield plate. The spring force generated by the arms may create points of contact between the shield plates and mating shields of a mating daughtercard connector (e.g., the ground shields 502*a*, 502*b* of the daughtercard connector 102). The generated spring force is configured to be sufficient to ensure the points of contact even after the daughtercard connector has been repeatedly mated and unmated from backplane connector.

FIG. 10D is an enlarged cross-sectional view of circled region 10D in FIG. 10A, according to some embodiments. A cross section through a backplane separator 922*a* is visible in this view. Behind separator 922*a* is a shield blade 804. Shield blade 804 is between separator 922*a* and 922*b*.

In the illustrated embodiment, the separators 922 extend from floor 1024 and may be formed, for example, as part of a molding operation that forms housing 808. Contact 902 has its distal tip retained by shelf 1030 of separator 922*a*. Contact 902 may be bent so that contact surface 924 extends past shelf 1030 such that it may make contact with a conductive element from a mating connector. Mating portions 312 in the daughter card connector may similarly be positioned within separators 322 for mating. As a result, when the connectors are mated, conductive elements acting as signal conductors within separators 922 may contact conductive elements acting as signal conductors within separators 322, completing signal paths through the mated connectors.

Figure 11B:
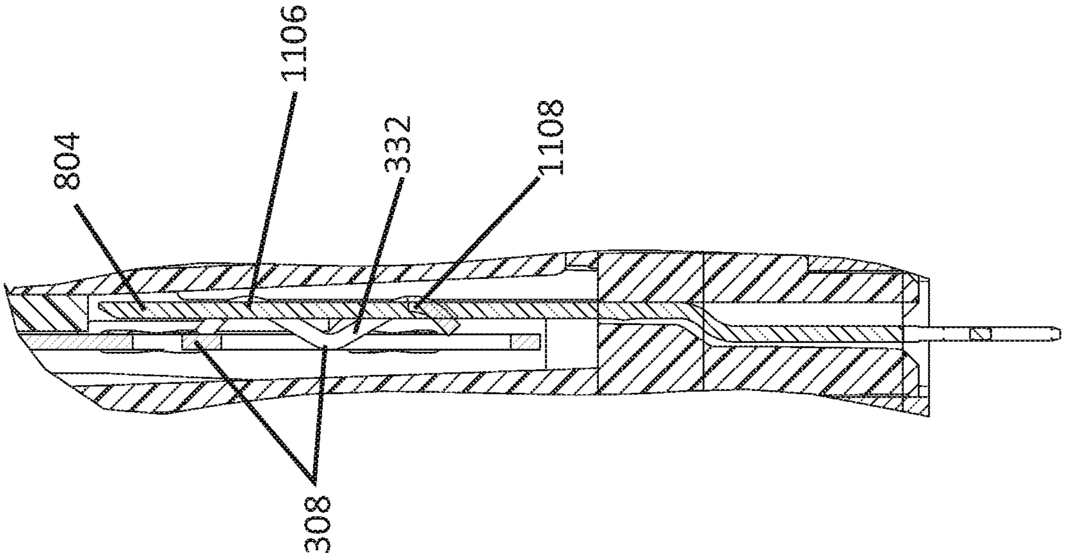
FIG. 11B is a partial cross-sectional view along line 11B in FIG. 11A, according to some embodiments.
Figure 11A:
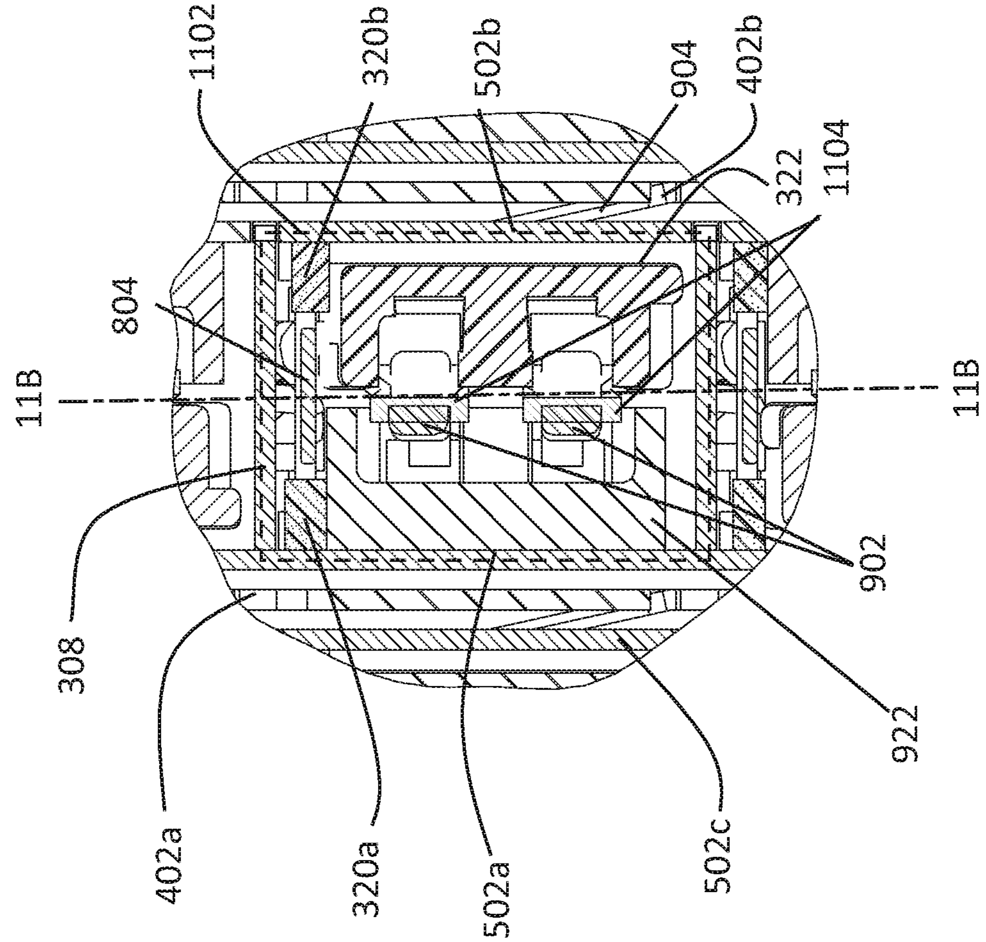
FIG. 11A is a cut-away plan view along line 11A in FIG. 1, according to some embodiments.

FIG. 11A is a cut-away plan view along line 11A in FIG. 1A, according to some embodiments. In the illustrated example, when the daughtercard connector 102 is mated with the backplane connector 104, a pair of signal conductors 1104 of the daughtercard connector 102 are mated with a respective pair of conductive elements 902 of the backplane connector 104. A shield blade 804 of the backplane connector is inserted between the pair of lossy portions 320*a* and 320*b*. The shield blade is not touching the lossy portions in the illustrated example, but may be in sufficient proximity to be electrically coupled to it. However, it should be appreciated that in some embodiments, a portion of a shield blade may contact the lossy portions.

FIG. 11A also illustrates that a ground cross shield 308 may contact or be connected to at least one of the left and right ground plate shields 502*a* and 502*c*. An enclosure 1102 may be formed around the pair of signal conductors, with ground conductors on at least a portion of all four sides around the signal conductors. This enclosure may be in mating region, and may carry through into both the daughtercard connector and backplane connector. Within the mating interface, enclosure 1102 is formed by two adjacent ground cross shield connected with the left and right ground plate shields. Separators 322 and 922 may be between the signal conductors and the enclosure. As described above in connection with FIGS. 3-6, the shielding at the mating interface is carried into the daughtercard connector, with the left and right ground plate shields 502*a* and 502*b* adjacent to intermediate portions of the signal conductors separating signal conductors in adjacent columns. Ground conductors within signal leadframe 302, coupled to ground cross shield 308, separate adjacent pairs within the columns.

Signal conductors are also surrounded by shields within the backplane connector. Backplane shield plates 402*a* and 402*b* are positioned between adjacent columns. Shield blades 804 are positioned between adjacent pairs of signal conductors within a column. To carry the shielding through the connector system, backplane shield plates 402*a* and 402*b* are coupled to ground plate shields 502*a* and 502*b* via contact features 904. Shield blades 804 are coupled to ground cross shield 308 contact features 332.

FIG. 11B is a partial cross-sectional view along line 11B in FIG. 11A, according to some embodiments. FIG. 11B depicts two contact points 1106 and 1108 formed between the ground cross shield 308 and shield blade 804 when the daughtercard and backplane connectors are mated. The two contact points may be formed by the contact features 332. The contact features 332 may include arms formed in a similar manner as the contact features 904. The arm of a contact feature 332 of a ground cross shield 308 may be substantially Z-shaped, as illustrated in FIG. 12A. The two turning points of a "Z" arm may be configured as points of contact to a mating conductor (e.g., a shield blade 804).

Figure 12B:
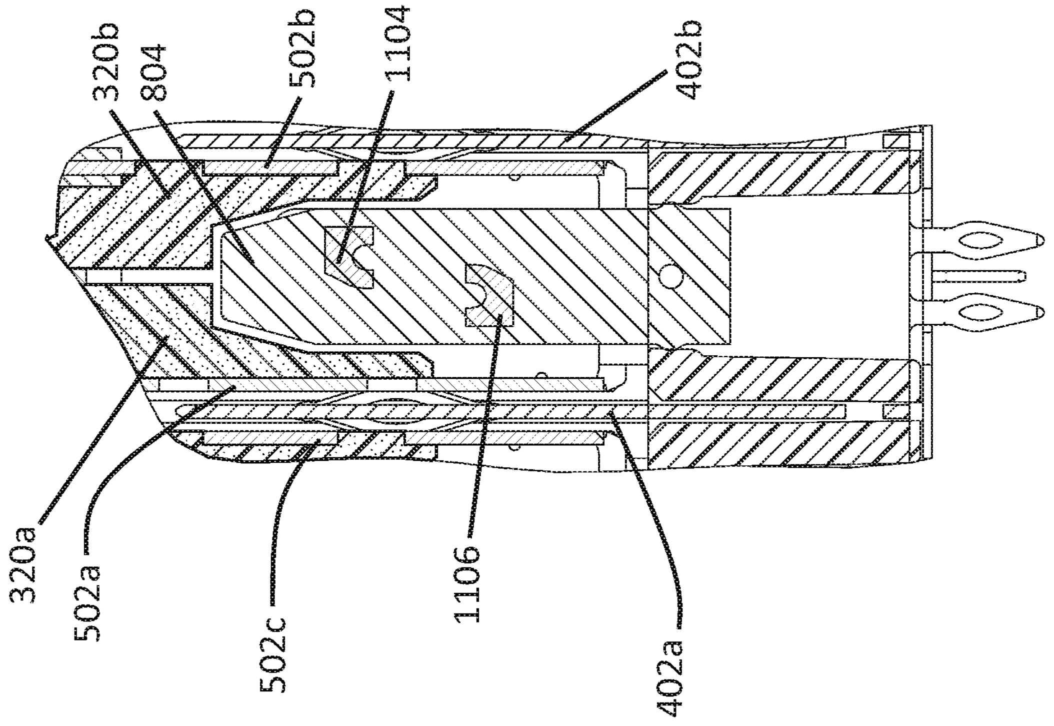
FIG. 12B is a partial cross-sectional view along line 12A in FIG. 1, illustrating the daughtercard connector and backplane connector in a mated condition, according to some embodiments.
Figure 12A:
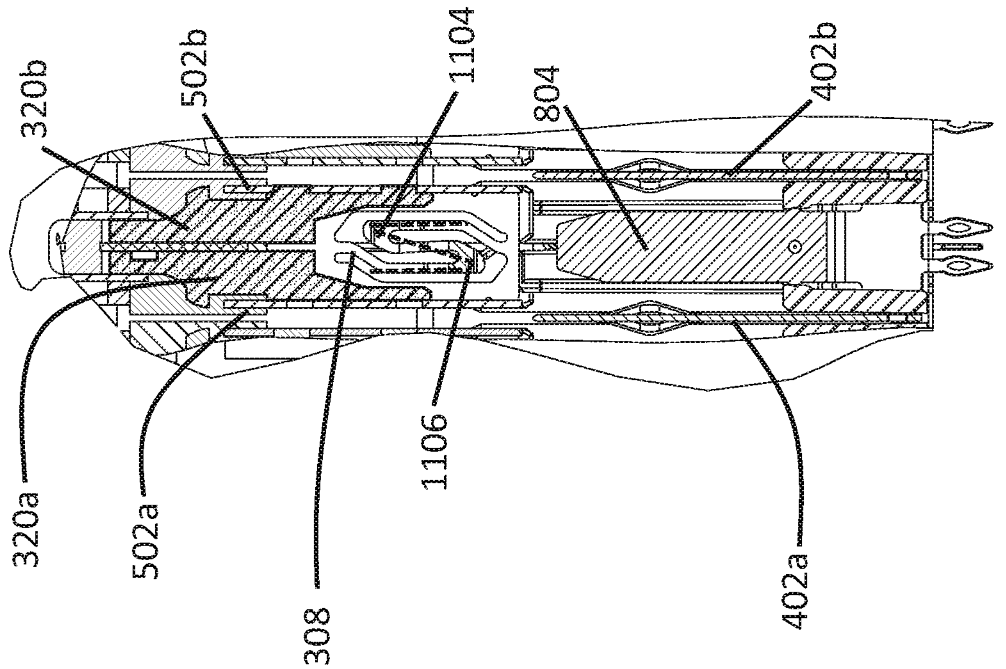
FIG. 12A is a partial cross-sectional view in accordance with line 12A in FIG. 1, illustrating the daughtercard connector and backplane connector in an unmated condition, according to some embodiments.

FIG. 12A and FIG. 12B are partial cross-sectional views taken along line 12A in FIG. 1A. FIGS. 12A and 12B depict the daughtercard connector and backplane connector in unmated and mated conditions, respectively. In the illustrated example, when the two connectors mated, a ground cross shield 308 of the daughtercard connector 102 contacts a shield blade 804 of the backplane connector 104 at two points 1104 and 1106. The lossy portions 320*a* and 320*b* bound a space into which the shield blade 804 is inserted. Once inserted, lossy portions 320*a* and 320*b* encircle the distal end of the shield blade 804. In the embodiment illustrated, lossy portions 320*a* and 320*b* bound at least 30% of a perimeter of the shield blade 804 extending above floor 1024. However, in other embodiments, the lossy portions may bound more or less of the perimeter, such as between 20% and 100%, or between 25% and 80%, or between 30% and 60%, according to some embodiments. The shield plate 402*a* of the backplane connector 104 contacts both the left ground plate shield 502*a* of the first wafer 200*a* and the right ground plate shield 502*c* of the second wafer 200*b*.

Although details of specific configurations of conductive elements, housings, and shield members are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. As a specific example of a possible variation, lossy material is described only in a daughter card connector. Lossy material may alternatively or additionally be incorporated into either connector of a mating pair of connectors. That lossy material may be attached to ground conductors or shields, such as the shields in backplane connector 104.

As an example of another variation, the connector may be configured for a frequency range of interest, which may depend on the operating parameters of the system in which such a connector is used, but may generally have an upper limit between about 15 GHz and 112 GHz, such as 25 GHz, 30 GHz, 40 GHz, 56 GHz, or 112 GHz, although higher frequencies or lower frequencies may be of interest in some applications. Some connector designs may have frequency ranges of interest that span only a portion of this range, such as 1 to 10 GHz or 3 to 15 GHz or 5 to 35 GHz.

The operating frequency range for an interconnection system may be determined based on the range of frequencies that can pass through the interconnection with acceptable signal integrity. Signal integrity may be measured in terms of a number of criteria that depend on the application for which an interconnection system is designed. Some of these criteria may relate to the propagation of the signal along a single-ended signal path, a differential signal path, a hollow waveguide, or any other type of signal path. Two examples of such criteria are the attenuation of a signal along a signal path or the reflection of a signal from a signal path.

Other criteria may relate to interaction of multiple distinct signal paths. Such criteria may include, for example, near end cross talk, defined as the portion of a signal injected on one signal path at one end of the interconnection system that is measurable at any other signal path on the same end of the interconnection system. Another such criterion may be far end cross talk, defined as the portion of a signal injected on one signal path at one end of the interconnection system that is measurable at any other signal path on the other end of the interconnection system.

As specific examples, it could be required that signal path attenuation be no more than 3 dB power loss, reflected power ratio be no greater than −20 dB, and individual signal path to signal path crosstalk contributions be no greater than −50 dB. Because these characteristics are frequency dependent, the operating range of an interconnection system is defined as the range of frequencies over which the specified criteria are met.

Designs of an electrical connector are described herein that improve signal integrity for high frequency signals, such as at frequencies in the GHz range, including up to about 25 GHz or up to about 40 GHz, up to about 56 GHz or up to about 60 GHz or up to about 75 GHz or up to about 112 GHz or higher, while maintaining high density, such as with a spacing between adjacent mating contacts on the order of 3 mm or less, including center-to-center spacing between adjacent contacts in a column of between 1 mm and 2.5 mm or between 2 mm and 2.5 mm, for example. Spacing between columns of mating contact portions may be similar, although there is no requirement that the spacing between all mating contacts in a connector be the same.

Manufacturing techniques may also be varied. For example, embodiments are described in which the daughtercard connector 600 is formed by organizing a plurality of wafers onto a stiffener. It may be possible that an equivalent structure may be formed by inserting a plurality of shield pieces and signal receptacles into a molded housing.

As another example, connectors are described that are formed of modules, each of which contains one pair of signal conductors. It is not necessary that each module contain exactly one pair or that the number of signal pairs be the same in all modules in a connector. For example, a 2-pair or 3-pair module may be formed. Moreover, in some embodiments, a core module may be formed that has two, three, four, five, six, or some greater number of rows in a single-ended or differential pair configuration. Each connector, or each wafer in embodiments in which the connector is waferized, may include such a core module. To make a connector with more rows than are included in the base module, additional modules (e.g., each with a smaller number of pairs such as a single pair per module) may be coupled to the core module.

Furthermore, although many inventive aspects are shown and described with reference to a daughterboard connector having a right angle configuration, it should be appreciated that aspects of the present disclosure is not limited in this regard, as any of the inventive concepts, whether alone or in combination with one or more other inventive concepts, may be used in other types of electrical connectors, such as backplane connectors, cable connectors, stacking connectors, mezzanine connectors, I/O connectors, chip sockets, etc.

In some embodiments, contact tails were illustrated as press fit "eye of the needle" compliant sections that are designed to fit within vias of printed circuit boards. However, other configurations may also be used, such as surface mount elements, spring contacts, solderable pins, etc., as aspects of the present disclosure are not limited to the use of any particular mechanism for attaching connectors to printed circuit boards.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. An electrical connector comprising:
a plurality of assemblies, each of the plurality of assemblies comprising:
a plurality of signal conductors, each of the plurality of signal conductors having a mating contact portion comprising a distal end;
a housing holding the plurality of signal conductors with the mating contact portions of the plurality of signal conductors in a column; and
a plurality of lossy portions extending between the mating contact portions of adjacent signal conductors of the plurality of signal conductors, wherein:
each of the plurality of lossy portions tapers towards the distal ends of the mating contact portions of the plurality of signal conductors such that a width of the lossy portion in a direction perpendicular to the column decreases towards the distal ends of the mating contact portion.

2. The electrical connector of claim 1, wherein:
each of the plurality of lossy portions is configured to partially encircle ground conductors of a mating connector when the electrical connector is mated with the mating connector.

3. The electrical connector of claim 1, wherein:
the plurality of signal conductors comprise a plurality of pairs of signal conductors, and
each of the plurality of assemblies comprises a conductive shield forming at least a portion of enclosures for individual pairs of the plurality of pairs of signal conductors.

4. The electrical connector of claim 3, wherein:
each of the enclosures has at least one corner with a lossy portion of the plurality of lossy portions disposed therein.

5. The electrical connector of claim 3, wherein:
the conductive shield is electrically coupled to a ground conductor of a mating connector when the connector is mated with the mating connector.

6. The electrical connector of claim 1, wherein:
each of the plurality of assemblies comprises insulative material separating the plurality of signal conductors from the plurality of lossy portions.

7. The electrical connector of claim 1, wherein each of the plurality of assemblies comprises:
a first conductive shield disposed on a first side of the plurality of signal conductors and extending parallel to the column;
a second conductive shield disposed on a second side opposite the first side of the plurality of signal conductors and extending parallel to the column; and
a plurality of ground cross shields, each of the plurality of ground cross shields extending between the first conductive shield and the second conductive shield and perpendicular to the column.

8. The electrical connector of claim 7, wherein:
each of the plurality of ground cross shields comprises a compliant contact portion; and
the compliant contact portion is configured to mate with a ground conductor of a mating connector.

9. The electrical connector of claim 7, wherein each of the plurality of assemblies comprises:
a first lossy member attached to the first conductive shield; and
a second lossy member attached to the second conductive shield.

10. The electrical connector of claim 9, wherein:
the first conductive shield has a first surface facing the plurality of signal conductors and a second surface facing opposite to the first surface, and
the first lossy member comprises:
a first portion attached to the second surface of the first conductive shield; and
a second portion attached to the first surface of the first conductive shield, the second portion comprising lossy portions of the plurality of lossy portions extending between the mating contact portions of adjacent signal conductors of the plurality of signal conductors.

11. The electrical connector of claim 10, wherein:
the second portion of the lossy member comprises a plurality of ribs configured to form channels that hold the plurality of signal conductors.

12. The electrical connector of claim 11, wherein:
each rib of the plurality of rib comprises an elongated member extending perpendicularly to the first surface of the first conductive shield so that the plurality of ribs form the channels between adjacent ribs of the plurality of ribs that hold intermediate portions of the plurality of signal conductors; and
each of the plurality of lossy portions extends from a respective rib of the plurality of ribs toward distal ends of the mating contact portions of the plurality of signal conductors and disposed between the mating contact portions of respective pairs of the plurality of signal conductors.

13. The electrical connector of claim 10, wherein each of the plurality of assemblies comprises:

an insulative member attached to the first conductive shield, the insulative member comprising:

a first portion attached to the first surface of the first conductive shield, the first portion comprising a plurality of separators configured to form channels that hold the mating contact portions of the plurality of signal conductors; and a second portion attached to the second surface of the first conductive shield.

14. The electrical connector of claim 13, wherein:

each of the plurality of ground cross shields is between one of the plurality of lossy portions and one of the plurality of separators of the insulative member.

15. The electrical connector of claim 9, wherein:

the first lossy member belongs to a left assembly on a left side of the column of signal conductors, the second lossy member belongs to a right assembly on a right side of the column of signal conductors opposite the left side, and the column of signal conductors, the left assembly, and the right assembly constitute a wafer.

16. The electrical connector of claim 15, wherein:

the wafer is a first wafer; and the electrical connector comprises a plurality of wafers aligned in a direction substantially perpendicular to the column.

17. The electrical connector of claim 1, wherein:

the plurality of lossy portions are disposed in pairs facing each other; and each pair of lossy portions is disposed between the mating contact portions of respective adjacent pairs of conductive elements of the plurality of signal conductors.

18. The electrical connector of claim 17, wherein:

each of the plurality of lossy portions is horn-shaped.

19. The electrical connector of claim 17, wherein:

each pair of lossy portions is configured to receive a ground conductor of a mating connector when the connector is mated with the mating connector.

* * * * *